(12) United States Patent
Anthias et al.

(10) Patent No.: US 7,551,567 B2
(45) Date of Patent: Jun. 23, 2009

(54) INTERPRETING AN APPLICATION MESSAGE AT A NETWORK ELEMENT USING SAMPLING AND HEURISTICS

(75) Inventors: Tefcros Anthias, Los Altos, CA (US); Sunil Potti, Castro Valley, CA (US); Subramanian Srinivasan, San Jose, CA (US); Nitesh Trikha, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 768 days.

(21) Appl. No.: 11/031,106

(22) Filed: Jan. 5, 2005

(65) Prior Publication Data

US 2006/0146879 A1     Jul. 6, 2006

(51) Int. Cl.
*H04L 12/26* (2006.01)
*H04L 12/56* (2006.01)

(52) U.S. Cl. ............................ 370/252; 370/474
(58) Field of Classification Search ................. None
See application file for complete search history.

(56) References Cited

U.S. PATENT DOCUMENTS

| | | | |
|---|---|---|---|
| 5,790,542 | A | 8/1998 | Kim et al. |
| 6,021,135 | A | 2/2000 | Ishihara et al. |
| 6,115,378 | A | 9/2000 | Hendel et al. |
| 6,125,391 | A | 9/2000 | Meltzer et al. |
| 6,145,079 | A | 11/2000 | Mitty et al. |
| 6,226,675 | B1 | 5/2001 | Meltzer et al. |
| 6,337,856 | B1 * | 1/2002 | Schanhals et al. ............ 370/352 |
| 6,341,130 | B1 * | 1/2002 | Lakshman et al. ............ 370/389 |
| 6,356,951 | B1 * | 3/2002 | Gentry, Jr. ................... 709/250 |

(Continued)

FOREIGN PATENT DOCUMENTS

EP     1217804     6/2002

(Continued)

OTHER PUBLICATIONS

International Searching Authority, "Notification of Transmittal of the International Search Report and the Written Opinion of the International Searching Authority, or the Declaration," PCT/US2006/024375, dated Oct. 17, 2006, 10 pages.

(Continued)

*Primary Examiner*—Gregory B Sefcheck
(74) *Attorney, Agent, or Firm*—Hickman Palermo Truong & Becker LLP

(57) ABSTRACT

A method is disclosed for interpreting an application message at a network element using sampling and heuristics. Using this method, a network element such as a router can determine, based solely on a data packet's packet headers, whether the network element ought to invest the time and processing power required to inspect and interpret the data packet's payload portion, or whether the network element can send the data packet toward the data packet's destination without inspecting and interpreting the data packet's payload portion. According to one aspect, while in a sampling state, the network element determines shared packet header characteristics possessed by packet headers of all data packets that require application layer message inspection. While in a processing state, the network element forgoes application layer message inspection relative to data packets whose packet headers do not possess the shared packet header characteristics. The network element alternates between the states.

22 Claims, 29 Drawing Sheets

U.S. PATENT DOCUMENTS

| | | | |
|---|---|---|---|
| 6,363,477 B1 | 3/2002 | Fletcher et al. | |
| 6,510,434 B1* | 1/2003 | Anderson et al. | 707/100 |
| 6,510,464 B1 | 1/2003 | Grantges et al. | |
| 6,587,431 B1 | 7/2003 | Almulhem et al. | |
| 6,597,918 B1 | 7/2003 | Kim | |
| 6,678,827 B1 | 1/2004 | Rothermel et al. | |
| 6,683,881 B1 | 1/2004 | Mijares et al. | |
| 6,718,326 B2 | 4/2004 | Uga et al. | |
| 6,745,041 B2 | 6/2004 | Allison et al. | |
| 6,772,211 B2 | 8/2004 | Lu et al. | |
| 6,772,223 B1 | 8/2004 | Corl, Jr. et al. | |
| 6,785,732 B1 | 8/2004 | Bates et al. | |
| 6,792,002 B2 | 9/2004 | Tezuka et al. | |
| 6,816,455 B2* | 11/2004 | Goldberg et al. | 370/230 |
| 6,862,270 B1 | 3/2005 | Ho | |
| 6,868,426 B1 | 3/2005 | Mankoff | |
| 6,944,678 B2 | 9/2005 | Lu et al. | |
| 6,950,822 B1 | 9/2005 | Idicula et al. | |
| 6,965,599 B1 | 11/2005 | Sakurai et al. | |
| 6,996,842 B2 | 2/2006 | Strahm et al. | |
| 7,089,586 B2 | 8/2006 | Kilgore | |
| 7,111,076 B2 | 9/2006 | Abjanic et al. | |
| 7,111,163 B1 | 9/2006 | Haney | |
| 7,126,907 B2 | 10/2006 | Carpini et al. | |
| 7,134,075 B2 | 11/2006 | Hind et al. | |
| 7,149,222 B2* | 12/2006 | Wiryaman et al. | 370/401 |
| 7,185,365 B2 | 2/2007 | Tang et al. | |
| 7,215,637 B1* | 5/2007 | Ferguson et al. | 370/230.1 |
| 7,215,641 B1* | 5/2007 | Bechtolsheim et al. | 370/235 |
| 7,239,634 B1 | 7/2007 | Chakravorty | |
| 7,245,620 B2 | 7/2007 | Shankar | |
| 7,296,268 B2 | 11/2007 | Darling et al. | |
| 7,299,361 B1 | 11/2007 | Kim et al. | |
| 7,362,763 B2 | 4/2008 | Wybenga et al. | |
| 7,363,353 B2 | 4/2008 | Ganesan et al. | |
| 7,376,755 B2 | 5/2008 | Pandya | |
| 7,437,451 B2 | 10/2008 | Tang et al. | |
| 2002/0015485 A1 | 2/2002 | Bhusri | |
| 2002/0114274 A1 | 8/2002 | Sturges et al. | |
| 2002/0126672 A1 | 9/2002 | Chow et al. | |
| 2002/0136403 A1 | 9/2002 | Henson et al. | |
| 2002/0143981 A1 | 10/2002 | DeLima et al. | |
| 2002/0161907 A1 | 10/2002 | Moon | |
| 2002/0163933 A1 | 11/2002 | Benveniste | |
| 2002/0165957 A1 | 11/2002 | Devoe et al. | |
| 2002/0191622 A1 | 12/2002 | Zdan | |
| 2002/0194342 A1 | 12/2002 | Lu et al. | |
| 2002/0194345 A1 | 12/2002 | Lu et al. | |
| 2002/0194350 A1 | 12/2002 | Lu et al. | |
| 2003/0018726 A1 | 1/2003 | Low et al. | |
| 2003/0028599 A1 | 2/2003 | Kolsky | |
| 2003/0028616 A1 | 2/2003 | Aoki et al. | |
| 2003/0055818 A1 | 3/2003 | Faybishenko et al. | |
| 2003/0069975 A1 | 4/2003 | Abjanic et al. | |
| 2003/0084279 A1 | 5/2003 | Campagna | |
| 2003/0093530 A1 | 5/2003 | Syed | |
| 2003/0095569 A1 | 5/2003 | Wengrovitz et al. | |
| 2003/0105903 A1 | 6/2003 | Garnett et al. | |
| 2003/0112802 A1* | 6/2003 | Ono et al. | 370/389 |
| 2003/0112809 A1 | 6/2003 | Bharali et al. | |
| 2003/0115448 A1 | 6/2003 | Bouchard | |
| 2003/0163603 A1 | 8/2003 | Fry et al. | |
| 2003/0189935 A1 | 10/2003 | Warden et al. | |
| 2004/0001444 A1 | 1/2004 | Sadot et al. | |
| 2004/0006613 A1 | 1/2004 | Lemieux et al. | |
| 2004/0022250 A1 | 2/2004 | Chen et al. | |
| 2004/0022255 A1 | 2/2004 | Chen et al. | |
| 2004/0054886 A1 | 3/2004 | Dickinson et al. | |
| 2004/0088585 A1 | 5/2004 | Kaler et al. | |
| 2004/0121789 A1 | 6/2004 | Lindsey | |
| 2004/0133775 A1 | 7/2004 | Callas et al. | |
| 2004/0136371 A1* | 7/2004 | Muralidhar et al. | 370/389 |
| 2004/0167986 A1 | 8/2004 | Gilfix et al. | |
| 2004/0170182 A1 | 9/2004 | Higashida et al. | |
| 2004/0205336 A1 | 10/2004 | Kessler et al. | |
| 2004/0221319 A1* | 11/2004 | Zenoni | 725/132 |
| 2004/0264481 A1 | 12/2004 | Darling et al. | |
| 2004/0267920 A1 | 12/2004 | Hydrie et al. | |
| 2004/0268357 A1 | 12/2004 | Joy et al. | |
| 2005/0021836 A1 | 1/2005 | Reed et al. | |
| 2005/0025091 A1 | 2/2005 | Patel et al. | |
| 2005/0041670 A1 | 2/2005 | Lin et al. | |
| 2005/0050362 A1 | 3/2005 | Peles | |
| 2005/0054346 A1 | 3/2005 | Windham et al. | |
| 2005/0063377 A1 | 3/2005 | Bryant et al. | |
| 2005/0071508 A1 | 3/2005 | Brown et al. | |
| 2005/0080914 A1 | 4/2005 | Lerner et al. | |
| 2005/0094611 A1 | 5/2005 | Cheong et al. | |
| 2005/0102393 A1 | 5/2005 | Murray et al. | |
| 2005/0114394 A1 | 5/2005 | Kaipa et al. | |
| 2005/0117576 A1* | 6/2005 | McDysan et al. | 370/389 |
| 2005/0165828 A1 | 7/2005 | Lango et al. | |
| 2005/0169171 A1 | 8/2005 | Cheng et al. | |
| 2005/0188103 A1 | 8/2005 | Chen | |
| 2005/0213591 A1 | 9/2005 | Nakazawa et al. | |
| 2005/0216727 A1 | 9/2005 | Chattopadhyay et al. | |
| 2005/0228893 A1 | 10/2005 | Devarapalli et al. | |
| 2005/0229243 A1 | 10/2005 | Svendsen et al. | |
| 2005/0252970 A1 | 11/2005 | Howarth et al. | |
| 2005/0286461 A1 | 12/2005 | Zhang et al. | |
| 2006/0021010 A1 | 1/2006 | Atkins et al. | |
| 2006/0031374 A1 | 2/2006 | Lu et al. | |
| 2006/0123226 A1 | 6/2006 | Kumar et al. | |
| 2006/0123467 A1 | 6/2006 | Kumar et al. | |
| 2006/0123479 A1 | 6/2006 | Kumar et al. | |
| 2006/0129650 A1 | 6/2006 | Ho et al. | |
| 2006/0129689 A1 | 6/2006 | Ho et al. | |
| 2006/0155862 A1 | 7/2006 | Kathi et al. | |
| 2006/0167975 A1 | 7/2006 | Chan et al. | |
| 2006/0168334 A1 | 7/2006 | Potti et al. | |
| 2006/0248225 A1 | 11/2006 | Batz et al. | |

FOREIGN PATENT DOCUMENTS

| | | |
|---|---|---|
| WO | WO 99/07116 | 2/1999 |
| WO | WO 02/27507 | 4/2002 |
| WO | WO 03/021465 A1 | 3/2003 |

OTHER PUBLICATIONS

Current Claims, PCT/US2006/024375, 6 pages.
Decasper, Dan et al., "Router Plugins: A Software Architecture for Next-Generation Routers," IEEE ACM Transactions on Networking, vol. 9, No. 1, Feb. 2000, XP011038838, 14 pages.
International Searching Authority, "Notification of Transmittal of the International Search Report and the Written Opinion of the International Searching Authority, or the Declaration," PCT/US05/44171, dated Nov. 30, 2006, 7 pages.
Current Claims, PCT/US05/44171, 9 pages.
Marc Girardot and Neel Sundaresan. Millau: an encoding format for efficient representation and exchange for XMLover the web. [retrieved Jan. 31, 2005]. Retrieved from the internet: <URL: http://www9.org/w9cdrom/154/154.html>.
Fujitsu Limited, et al.. Web Services Reliability (WS-Reliability). Ver1.0. Jan. 8, 2003, pp. 1-45.
Ruslan Bilorusets et al.. Web Services Reliable Messaging Protocol (WS-ReliableMessaging). Mar. 2004.
International Searching Authority, "Notification of Transmittal of the International Search Report and the Written Opinion of the International Searching Authority, or the Declaration," PCT/US05/43599, dated Feb. 28, 2007, 8 pages.
Current Claims, PCT/US05/43599, 8 pages.

International Searching Authority, "Notification of Transmittal of the International Search Report and the Written Opinion of the International Searching Authority, or the Declaration," PCT/US05/41254, dated Mar. 28, 2007, 7 pages.
Current Claims, PCT/US05/41254, 11 pages.
International Searching Authority, "Notification of Transmittal of the International Search Report and the Written Opinion of the International Searching Authority, or the Declaration", International application No. PCT/US05/46149, dated Jul. 20, 2007, 9 pages.
Claims, International application No. PCT/US05/46149, 10 pages.
International Searching Authority, "Notification of Transmittal of the International Search Report and the Written Opinion of the International Searching Authority, or the Declaration," PCT/US05/45625, dated Oct. 20, 2006, 7 pages.
Current Claims PCT/US05/45625, 9 pages.
International Searching Authority, "Notification of Transmittal of the International Search Report and the Written Opinion of the International Searching Authority, or the Declaration," PCT/US05/40861, dated Nov. 17, 2006, 7 pages.
Current Claims PCT/US05/40861, 6 pages.
Girardot, Marc, et al., "Millau: An Encoding Format for Efficient Representation and Exchange of XML Over the Web", Computer Networks, Netherlands, vol. 33, Jun. 2000, 22 pages.
Burns, Michael, et al., "Implementing Address Assurance in the Intel IXP Router", Western Network Processors Conference, Oct. 2002, 17 pages.
Chiu, Kenneth, et al., "Investigating the Limits of SOAP Performance for Scientific Computing", Nov. 7, 2002, IEEE Computer Society, 8 pages.
Schramm, Cheryl, et al., "Application- Oriented Network Modeling with Mobile Agents", IEEE, 1998, 5 pages.
State Intellectual Property Office of the People's Republic of China, "The First Office Action", filing No. 200580031571.0, Dated Dec. 19, 2008, 9 pages.
Claims, filing No. 200580031571.0, 8 pages.
State Intellectual Property Office of the People's Republic of China, "The First Office Action", filing No. 200580045932.7, Dated Nov. 28, 2008, 8 pages.
Claims, filing No. 200580045932.7, 8 pages.
European Patent Office, "European Search Report", application No. EP 05820894, Feb. 6, 2009, 8 pages.
Claims, application No. EP 05820894, 6 pages.

* cited by examiner

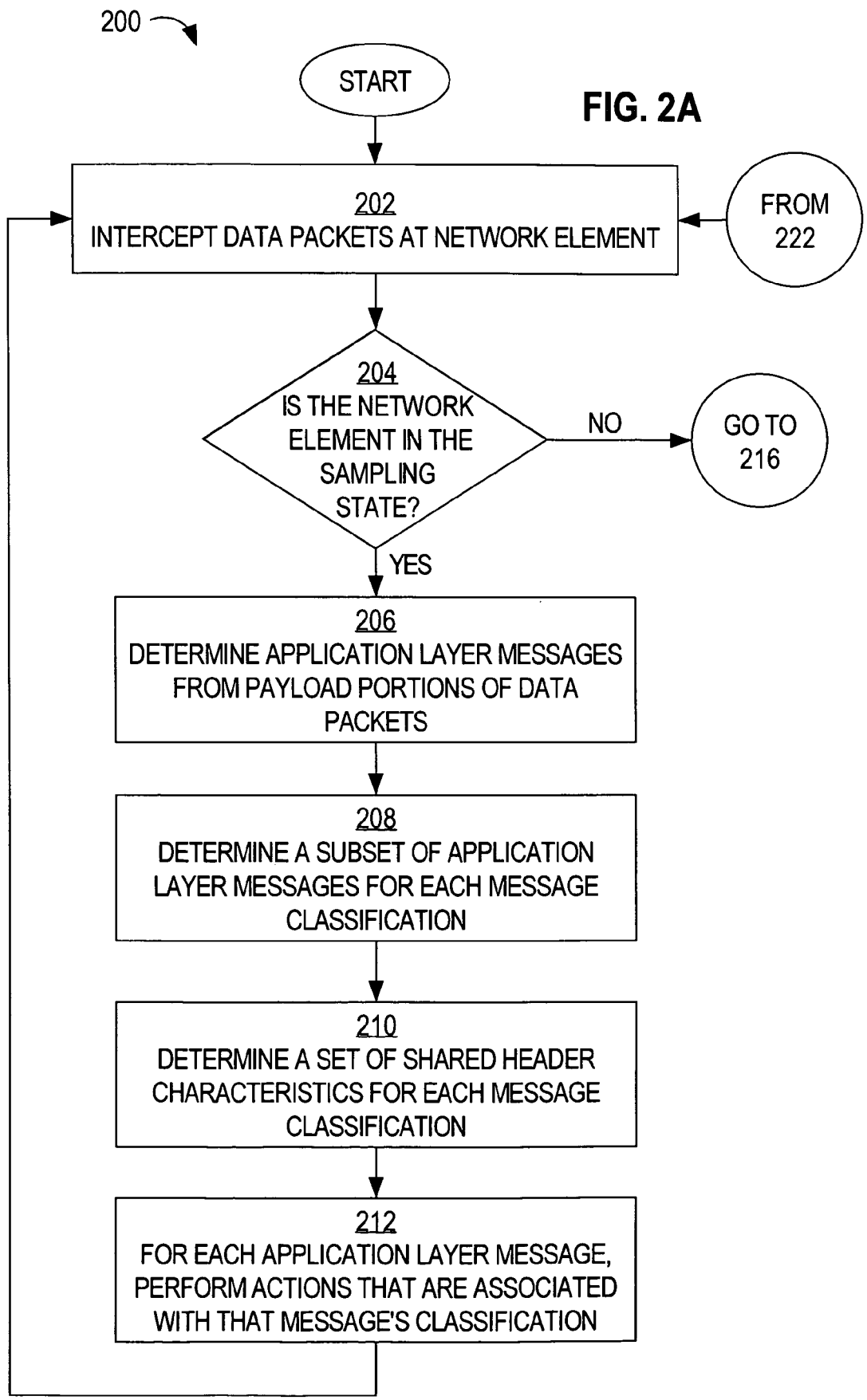

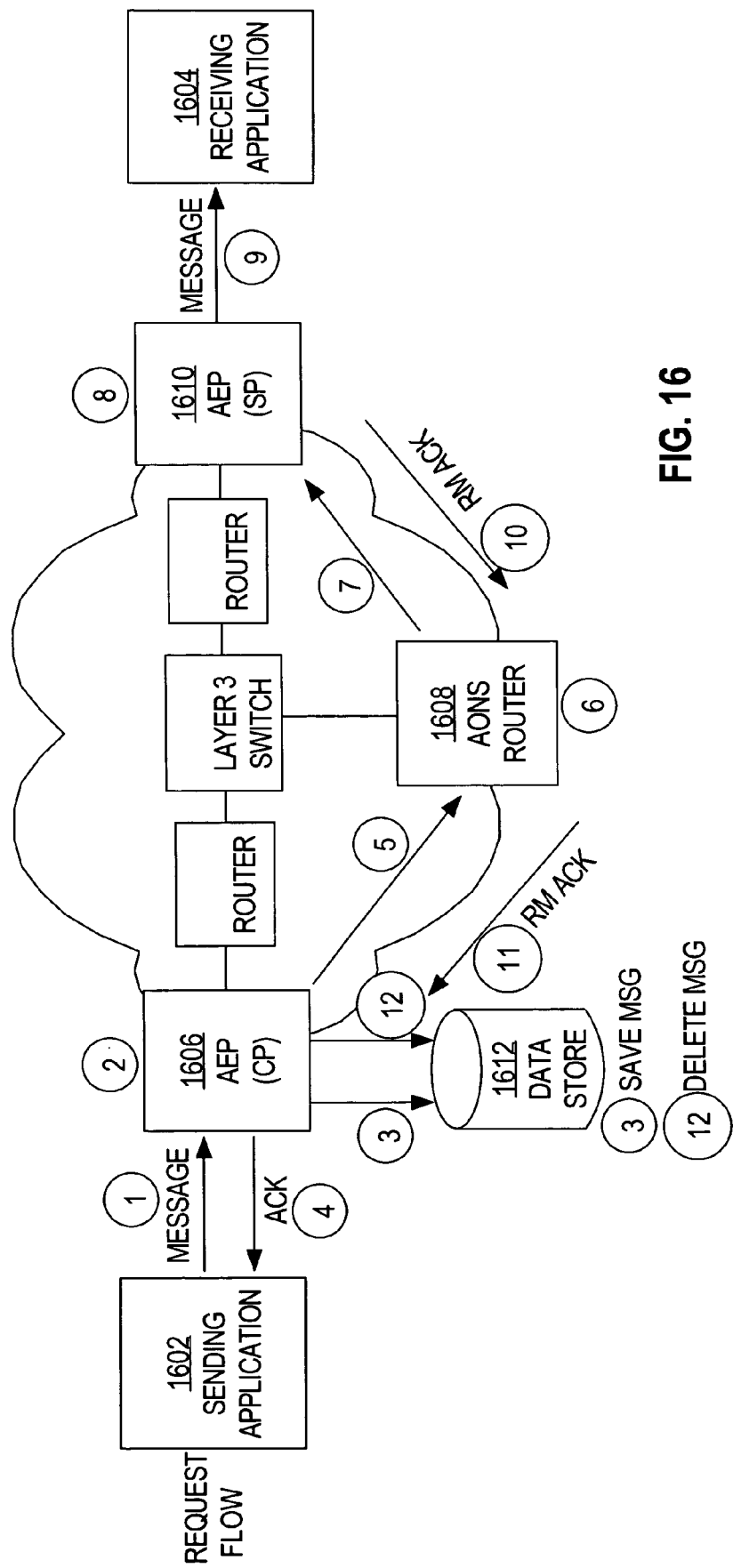

INTERPRETING AN APPLICATION MESSAGE AT A NETWORK ELEMENT USING SAMPLING AND HEURISTICS

RELATED APPLICATIONS

This application is related to U.S. patent application Ser. No. 10/991,792, entitled "PERFORMING MESSAGE AND TRANSFORMATION ADAPTER FUNCTIONS IN A NETWORK ELEMENT ON BEHALF OF AN APPLICATION", filed on Nov. 17, 2004; U.S. patent application Ser. No. 10/997,616, entitled "CACHING CONTENT AND STATE DATA AT A NETWORK ELEMENT", filed on Nov. 23, 2004; U.S. patent application Ser. No. 11/005,978, entitled "PERFORMING MESSAGE PAYLOAD PROCESSING FUNCTIONS IN A NETWORK ELEMENT ON BEHALF OF AN APPLICATION", filed on Dec. 6, 2004; U.S. patent application Ser. No. 11/007,421, entitled "PERFORMING SECURITY FUNCTIONS ON A MESSAGE PAYLOAD IN A NETWORK ELEMENT", filed on Dec. 7, 2004; U.S. patent application Ser. No. 11/007,152, entitled "NETWORK AND APPLICATION ATTACK PROTECTION BASED ON APPLICATION LAYER MESSAGE INSPECTION", filed on Dec. 7, 2004; U.S. patent application Ser. No. 11/009,127, entitled "REDUCING THE SIZES OF APPLICATION LAYER MESSAGES IN A NETWORK ELEMENT", filed on Dec. 10, 2004; and U.S. patent application Ser. No. 11/009,270, entitled "GUARANTEED DELIVERY OF APPLICATION LAYER MESSAGES BY A NETWORK ELEMENT", filed on Dec. 10, 2004; the contents of all of which are incorporated by reference in their entirety for all purposes as though fully disclosed herein.

Field of the Invention

The present invention generally relates to network elements in computer networks. The invention relates more specifically to a method and apparatus for interpreting an application message at a network element using sampling and heuristics.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Typically, networks today process only data packets and network data instead of application data. In a business-to-business environment, applications executing on computers commonly communicate with other applications that execute on other computers. For example, an application "A" executing on a computer "X" might send, to an application "B" executing on a computer "Y," a message that indicates the substance of a purchase order.

Computer "X" might be remote from computer "Y." In order for computer "X" to send the message to computer "Y," computer "X" might send the message through a computer network such as a local area network (LAN), a wide-area network (WAN), or an inter-network such as the Internet. In order to transmit the message through such a network, computer "X" might use a suite of communication protocols. For example, computer "X" might use a network layer protocol such as Internet Protocol (IP) in conjunction with a transport layer protocol such as Transport Control Protocol (TCP) to transmit the message.

Assuming that the message is transmitted using TCP, the message is encapsulated into one or more data packets; separate portions of the same message may be sent in separate packets. Continuing the above example, computer "X" sends the data packets through the network toward computer "Y." One or more network elements intermediate to computer "X" and computer "Y" may receive the packets, determine a next "hop" for the packets, and send the packets towards computer "Y."

For example, a router "U" might receive the packets from computer "X" and determine, based on the packets being destined for computer "Y," that the packets should be forwarded to another router "V" (the next "hop" on the route). Router "V" might receive the packets from router "U" and send the packets on to computer "Y." At computer "Y," the contents of the packets may be extracted and reassembled to form the original message, which may be provided to application "B." Applications "A" and "B" may remain oblivious to the fact that the packets were routed through routers "U" and "V." Indeed, separate packets may take different routes through the network.

A message may be transmitted using any of several application layer protocols in conjunction with the network layer and transport layer protocols discussed above. For example, application "A" may specify that computer "X" is to send a message using Hypertext Transfer Protocol (HTTP). Accordingly, computer "X" may add HTTP-specific headers to the front of the message before encapsulating the message into TCP packets as described above. If application "B" is configured to receive messages according to HTTP, then computer "Y" may use the HTTP-specific headers to handle the message. To construct an application-level message, the network device has to terminate the protocol and assemble the packets.

In addition to all of the above, a message may be structured according to any of several message formats. A message format generally indicates the structure of a message. For example, if a purchase order comprises an address and a delivery date, the address and delivery date may be distinguished from each other within the message using message format-specific mechanisms. For example, application "A" may indicate the structure of a purchase order using Extensible Markup Language (XML). Using XML as the message format, the address might be enclosed within "<address>" and "</address>" tags, and the delivery date might be enclosed within "<delivery-date>" and "</delivery-date>" tags. If application "B" is configured to interpret messages in XML, then application "B" may use the tags in order to determine which part of the message contains the address and which part of the message contains the delivery date.

Often, though, different applications are designed to use different application layer protocols to send and receive messages. For example, application "A" might be designed to send messages using only HTTP, but application "B" might be designed to receive messages using only File Transfer Protocol (FTP), another application layer protocol. Furthermore, different applications may be designed to use different message formats to format and interpret messages. For example, application "A" might be designed to format messages using only XML, but application "B" might be designed to interpret messages using only Electronic Data Interchange (EDI).

Usually, it is not practical or even possible to design or update an application so that the application can converse with other applications using all possible message formats and application layer protocols. Some message formats and application layer protocols may be proprietary and not publicly disclosed. Some message formats and application layer protocols may be relatively new and obscure. Some message formats and application layer protocols may be so old as to be considered generally obsolete.

In conventional practice, routers, switches, and other intermediary network elements route or switch individual frames, datagrams, and packets without any knowledge, awareness, or processing of the higher-order application layer messages embodied in flows of packets. In order to reduce the amount of application modification required to allow an application to converse with other applications that might use different message formats and/or application layer protocols, intermediary network elements separate from such applications may be designed to receive messages explicitly sent to those network elements, "translate" the messages, and then send the messages. This translation may be achieved by looking for a specified bit pattern beginning at a specified bit location in a packet, and then altering bits at the specified bit location if the specified bit pattern is found. For example, a network appliance "J" might be designed to receive messages that have been sent using HTTP and send those messages using FTP instead. For another example, a network appliance "K" might be designed to receive messages that are in XML format and translate those messages into EDI format. Thus, if application "A" sends messages in XML using HTTP, and application "B" receives messages in EDI using FTP, then application "A" can be configured so that messages that application "A" normally would address to application "B" are addressed to network appliance "J" instead. The network administrator can configure network appliance "J" to send messages to network appliance "K," and the network administrator can configure network appliance "K" to send messages to application "B."

Unfortunately, this approach requires a lot of effort from the network administrator. As the number of possible different application layer protocols and message formats used by communicating applications increases, the number of network appliances and paths between those network appliances rises dramatically. For each pair of sending and receiving applications, a network administrator following this approach must configure the applications and network appliances involved to ensure that the messages will follow the correct path through the relevant network appliances. Thus, if each of applications "A," "B," "C," "D," and "E" needed to communicate with each other, the network administrator following this approach might need to configure 25 different "paths" of one or more network appliances each. As applications are added, removed, and modified, the network administrator may need to add and/or remove certain network appliances from certain paths between application pairs. When many applications are involved, the burden can be more than most network administrators can bear.

Additionally, if multiple paths are configured to contain the same network appliance, then the network appliance may become a bottleneck that degrades network performance.

Thus, this "pair-wise path configuration" approach is impractical when applied to systems in which large numbers of diverse applications communicate. A more practical technique for allowing a multitude of diverse applications to communicate is needed.

Furthermore, existing intermediary network elements are limited in the kinds of processing that those network elements can perform on packets, and in the kinds of actions that those network elements can perform relative to packets. Typically, an existing intermediary network element performs only a single specialized operation relative only to data packets that possess matching parameters in those data packets' headers. Both the parameters and the operation are typically fixed and cannot be customized by an end user. A technique for allowing a greater number and variety of customizable operations to be performed relative to data flows is needed.

Additionally, processing the contents of data packets usually requires a significant amount of time and a significant portion of a network element's limited processing resources. In situations where network elements need to process the contents of data packets before sending those data packets to the data packets' destination, the network elements often cannot send the processed data packets at the same rate as the data packets would be sent if the contents of the data packets were not so processed. If a network element is forced to process the contents of all data packets that the network element receives, then packet latency may increase and packet throughput may decrease. Consequently, the overall performance of the network is generally degraded.

Under some circumstances, only the contents of some data packets need to be processed. Unfortunately, the determination of whether a particular data packet's contents need to be processed sometimes requires a thorough inspection of the contents themselves, and the thorough inspection requires nearly as significant an investment in time and processing power as the processing itself. A more efficient technique for reducing the fraction of data packets whose contents are thoroughly inspected is needed.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 2A-B depict a flow diagram that illustrates an overview of one embodiment of a method of interpreting an application message at a network element using sampling and heuristics;

FIG. 16 is a diagram that illustrates a one-way message flow with reliable message delivery;

DETAILED DESCRIPTION

Figure 1:
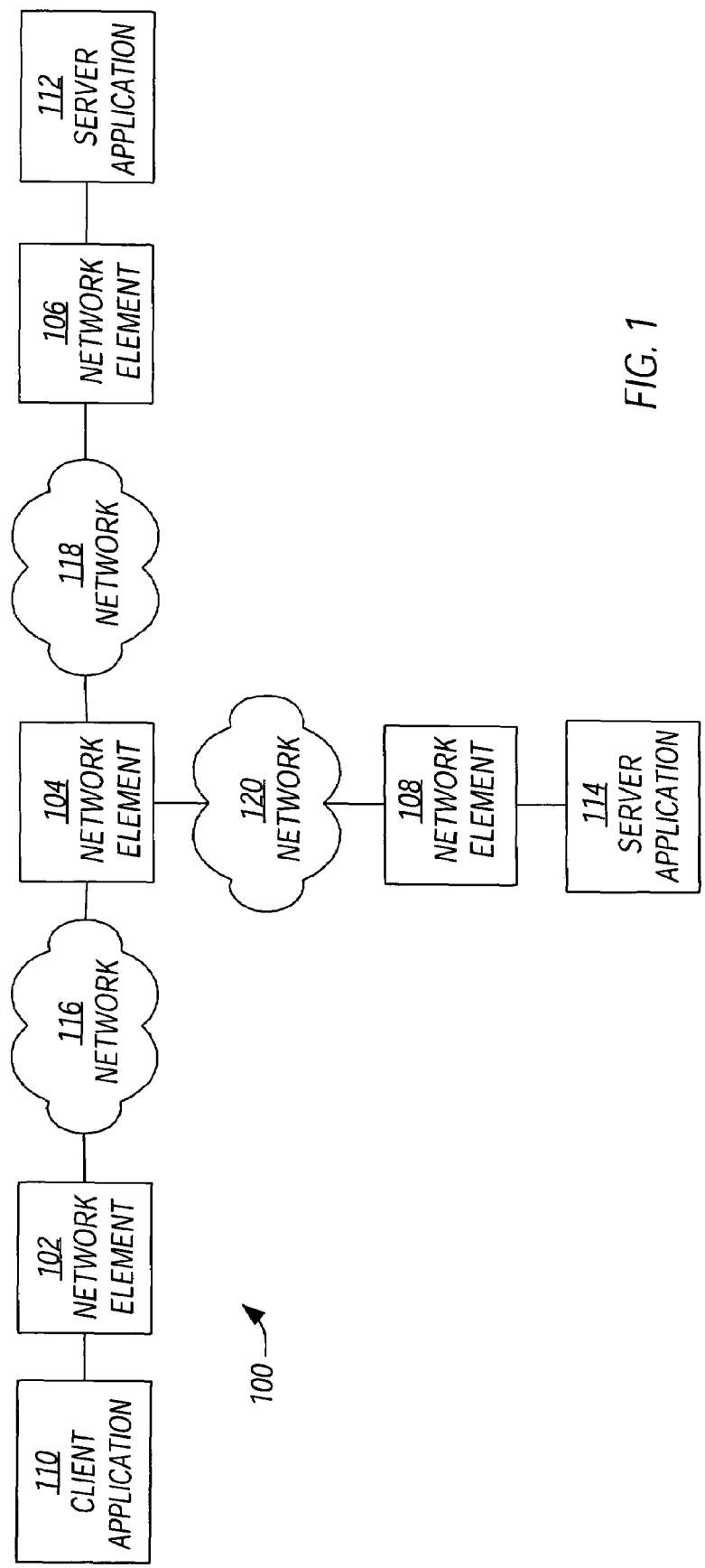
FIG. 1 is a block diagram that illustrates an overview of one embodiment of a system in which one or more network elements perform data packet sampling and processing.

A method and apparatus for interpreting an application message at a network element using sampling and heuristics is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Examples
   3.1 Multi-Blade Architecture
   3.2 Processing Application Layer Messages While In The Processing State
   3.3 Action Flows
   3.4 AONS Examples
      3.4.1 AONS General Overview
      3.4.2 AONS Terminology
      3.4.3 AONS Functional Overview
      3.4.4 AONS System Overview
      3.4.5 AONS System Elements
      3.4.6 AONS Example Features
      3.4.7 AONS Functional Modules
      3.4.8 AONS Modes of Operation
      3.4.9 AONS Message Routing
      3.4.10 Flows, Bladelets™, and Scriptlets™
      3.4.11 AONS Services
      3.4.12 AONS Configuration and Management
      3.4.13 AONS Monitoring
      3.4.14 AONS Tools
4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for interpreting an application message at a network element using sampling and heuristics. Using this method, a network element such as a router can determine, based solely on a data packet's packet headers, whether the network element ought to invest the time and processing power required to inspect and interpret the data packet's payload portion, or whether the network element can send the data packet toward the data packet's destination without inspecting and interpreting the data packet's payload portion.

According to one embodiment, the network element is in one of two states at any given time: a sampling state, or a processing state. A specified heuristic or algorithm may be used as the basis for determining which state the network element is in at any particular moment in time. The network element's behavior while in each of these states is described below.

While the network element is in the sampling state, the network element constructs application layer messages from payload portions of data packets that the network element receives. For each application layer message so constructed, the network element determines, based on the contents of the application layer message and/or other factors, one of potentially many defined message classifications to which the message belongs; each such message classification is associated with a set of criteria that a message needs to satisfy in order to belong to the message classification. A message classification is one or more sets of messages for which the network element will apply appropriate policies.

For each defined message classification, the network element analyzes the packet headers of the data packets that contain portions of messages that belong to that message classification. For purposes of brevity and clarity, as used herein, the term "message classification's header sets" means "packet header sets of the data packets that contain at least portions of messages that belong to the message classification" and the terms "packet header set of a data packet" and "data packet's header set" mean "a set of packet headers that are contained in the data packet." For example, a particular data packet's packet header set might include both a TCP header and an IP header contained in the particular data packet. Packet header sets may include Open Systems Interconnection (OSI) layer 2, 3, and 4 protocol headers.

Based on the packet header analysis discussed above, the network element determines, for each message classification, a set of one or more characteristics that all of that message classification's packet header sets have in common, if any. For example, for a particular message classification, the network element may determine that all of the message classification's header sets indicate the same source IP addresses and destination IP addresses. The network element determines as many shared characteristics as possible for each message classification. Thus, if a message classification's header sets have three characteristics in common, such as source IP address, destination IP address, and TCP port, then the network element determines that all three characteristics are shared for that message classification.

Different shared characteristics may be determined for different message classifications. For example, one message classification's header sets might only have source IP addresses in common, another message classification's header sets might only have destination IP addresses in common, and yet another message classification's header sets might have both source IP addresses and destination IP addresses in common. For purposes of brevity and clarity, as used herein, the term "message classification's shared header characteristics" means "the characteristics possessed by all of the message classification's header sets." Shared header characteristics for each message classification can be expanded for as long as the network element is in the sampling state.

In addition to determining shared header characteristics while in the sampling state, as discussed above, the network element may perform one or more specified actions that are associated with a particular message classification in response to determining that an application layer message belongs to the particular message classification.

Alternatively, while the network element is in the processing state, the network element does not necessarily construct application layer messages from payload portions of all data packets that the network element receives. Instead, for each data packet that the network element receives while in the processing state, the network element initially inspects that data packet's packet header set without inspecting the payload portion of the data packet. The network element determines whether the data packet's header set possesses all of any of the defined message classifications' shared header characteristics (if a particular message classification has no shared header characteristics, then the data packet's header set is determined to possess all of the particular message classification's shared header characteristics).

If the data packet's header set does not possess all of any of the defined message classifications' shared header characteristics, then the network element sends the data packet on toward the data packet's destination without ever having inspected the data packet's payload portion; under these circumstances, any application layer message that the data packet's payload portion might contain, at least partially, cannot belong to any defined message classification, so there is no need to inspect the payload portion.

Alternatively, if the data packet's header set possesses all of a message classification's shared header characteristics, then the network element uses the contents of the data packet's payload portion to at least partially construct an application layer message. For each application layer message so constructed, the network element determines, based on the contents of the application layer message and/or other factors, to which of the defined message classifications the message belongs, if any. The network element may perform one or more specified actions that are associated with a particular message classification in response to determining that an application layer message belongs to the particular message classification.

In one embodiment, the network element alternates between the sampling state and the processing state in accordance with specified time intervals. For example, after being in the sampling state during a first specified interval of time, such as 5 seconds, the network element may switch to the processing state during a second specified interval of time, such as an hour. Additionally or alternatively, the network element may switch from the processing state to the sampling state in response to a user command, or in response to the creation of a new message classification.

Thus, the network element can exclude certain data packets from the payload portion inspection and interpretation process based on the characteristics possessed by those data packets' header sets. Because a network element often can determine these packet header set characteristics significantly faster than the network element can inspect and interpret application layer message contained in data packet payload portions, the embodiment described above decreases data packet latency and increases data packet throughput at the network element while still allowing the network element to perform application layer message-based processing when desirable. Under some circumstances, it is not possible to predefine all possible message classifications. One embodiment of the invention helps to solve this problem.

In other aspects, the invention encompasses a computer apparatus and a computer-readable medium configured to carry out the foregoing steps.

2.0 Structural and Functional Overview

FIG. 1 is a block diagram that illustrates an overview of one embodiment of a system 100 in which one or more of network elements 102, 104, 106, and 108 perform data packet sampling and processing. Network elements 102, 104, 106, and 108 may be proxy devices and/or network switches and/or routers, such as router 600 depicted in FIG. 6 below, for example.

Client application 110 is coupled communicatively with network element 102. A server application 112 is coupled communicatively to network element 106. A server application 114 is coupled communicatively to network element 108. Client application 110 and server applications 112 and 114 may be separate processes executing on separate computers.

Network elements 102 and 104 are coupled communicatively with a network 116. Network elements 104 and 106 are coupled communicatively with a network 118. Network elements 104 and 108 are coupled communicatively with a network 120. Each of networks 116, 118, and 120 is a computer network, such as, for example, a local area network (LAN), wide area network (WAN), or internetwork such as the Internet. Networks 116, 118, and 120 may contain additional network elements such as routers.

Client application 110 addresses messages to server applications 112 and 114. Network elements 102, 104, 106, and 108 intercept the data packets that contain the messages. Each of network element 102, 104, 106, and 108 stores a set of defined message classifications, which may be user-specified. Depending on whether network elements 102, 104, 106, and 108 are in the sampling or processing states described above, the network elements may assemble one or more data packets to determine at least portions of application layer messages contained therein, determine sets of shared header characteristics for defined message classifications as described above, perform actions associated with defined message classifications to which application layer messages belong, and/or send the data packets toward server applications 112 and 114. Examples of some of the actions that network elements 102, 104, 106, and 108 may perform in response to determining that an application layer message belongs to a particular message classification are described in further detail below.

While in the processing state, network elements 102, 104, 106, and 108 send intercepted data packets toward the data packets' destinations without inspecting or interpreting payload portions of the data packets if the data packets' header sets do not possess all of any of the defined message classifications' shared header characteristics. This conserves the network elements' processing resources, which allows the network elements to process data packets more rapidly, on average.

Figure 2B:
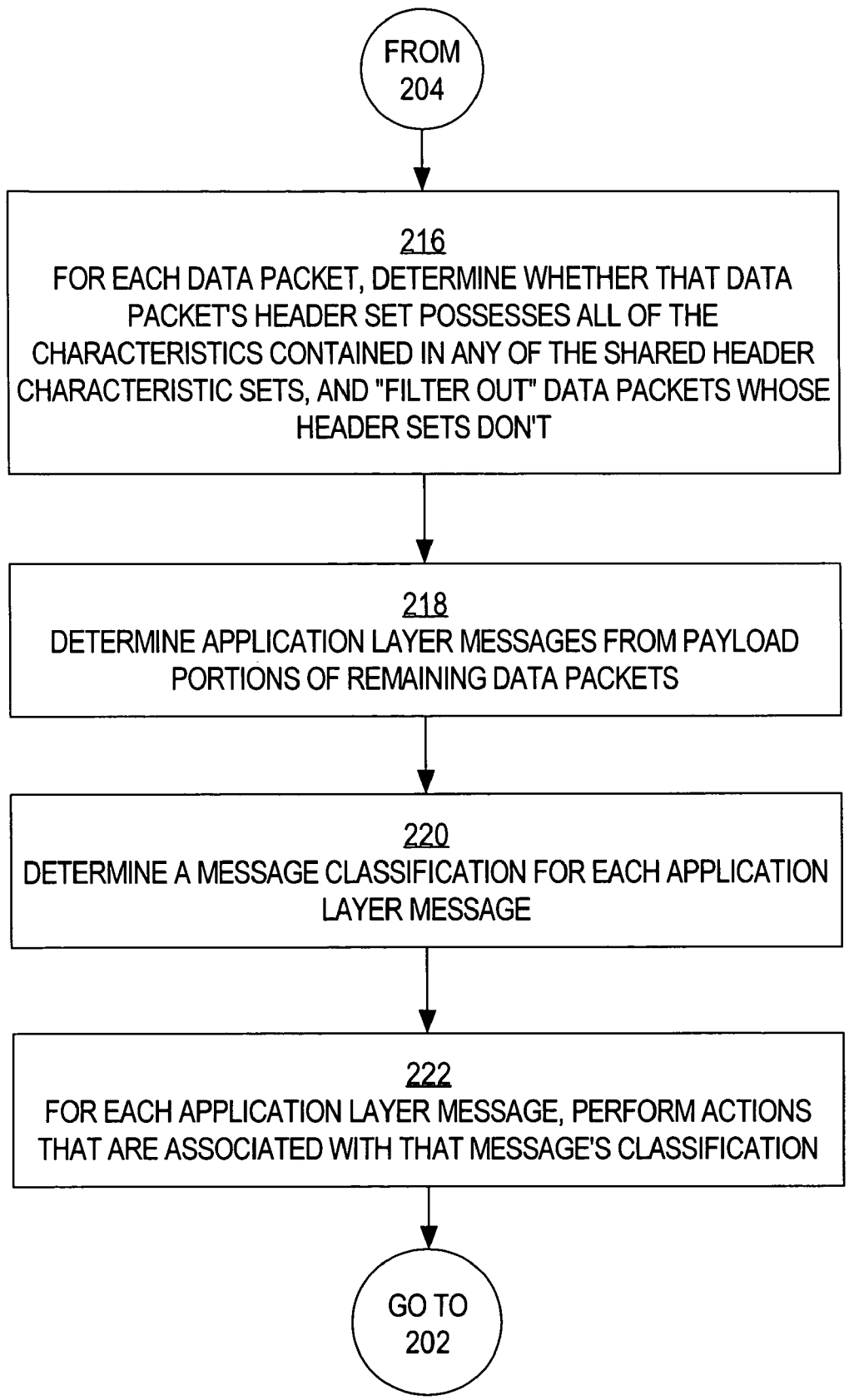

FIGS. 2A-B depict a flow diagram 200 that illustrates an overview of one embodiment of a method of interpreting an application message at a network element using sampling and heuristics. Such a method may be performed, for example, by any of network elements 102, 104, 106, and 108.

Referring to FIG. 2A, in block 202, data packets are intercepted at a network element. Each data packet comprises a packet header set and a payload portion. For example, network element 104 may intercept several data packets that client application 110 sent, some toward server application 112 and some toward server application 114. Each of the data packets may comprise an IP header and a TCP header, and a TCP payload portion that contains at least a portion of an application layer message, such as an XML document. TCP payload portions may contain separate portions of the same application layer message or different application layer messages.

In block 204, it is determined whether the network element is in the sampling state. For example, network element 104 may determine whether network element is currently in the sampling state or the processing state. If the network element is in the sampling state, then control passes to block 206. If the network element is in the processing state, then control passes to block 216 of FIG. 2B.

In block 206, application layer messages collectively contained in the payload portions are determined by inspecting the payload portions. For example, network element 104 may inspect and assemble contents of payload portions of multiple TCP packets to construct multiple separate application layer messages. Each application layer message may be a separate XML document, for example.

In block 208, for each particular message classification in a set of defined message classifications, a separate subset of the application layer messages that belong to the particular message classification is determined. A message belongs to a particular message classification if the message satisfies all of the criteria that are associated with the particular message classification. Control passes to block 210.

For example, assuming that there are "purchase order" and "account transaction" message classifications, that a message must contain a "PurchaseOrder" XML element to belong to the "purchase order" message classification, and that a message must contain an "AccountTransaction" element to belong to the "account transaction" message classification, network element 104 may determine, for each application layer message or portion thereof, whether that message or portion contains a "PurchaseOrder" XML element or an "AccountTransaction" XML element. If the message contains a "PurchaseOrder" XML element, then network element 104 may assign the message to a "purchase order" subset of messages that satisfy criteria associated with the "purchase order" message classification. If the message contains an "AccountTransaction" XML element, then network element 104 may assign the message to an "account transaction" subset of messages that satisfy criteria associated with the "account transaction" message classification. If the message does not contain either XML element, then network element 104 may not assign the message to either subset of messages.

In block 210, for each particular message subset, a separate set of shared header characteristics is determined. A packet header set characteristic is a shared header characteristic for a particular message subset only if, for every data packet that contained at least a portion of a message in the particular message subset, the packet header set contained in that data packet possesses the characteristic. Control passes to block 212.

For example, the "account transaction" message subset might contain three separate messages, each of which was contained in a different data packet. If the IP headers of all of those data packets contain the same IP source address and the same IP destination address, then both the IP source address and the IP destination address may be shared header characteristics for the "account transaction" message subset. If the TCP headers of all of those data packets contain the same TCP destination port, then the TCP destination port also may be a shared header characteristic for the "account transaction" message subset.

In block 212, for each application layer message, one or more actions that are associated with the message classification to which that message belongs are performed at the network element. Control passes back to block 202. For example, for each message that belongs to the "account transaction" message classification, network element 104 may perform a first set of actions that are associated with the "account transaction" message classification, and for each message that belongs to the "purchase order" message classification, network element 104 may perform a second set of actions that are associated with the "purchase order" message classification. These actions may include forwarding the messages towards a destination, such as server application 112 or server application 114. Some other possible actions are described below.

At some point in time, the network element switches from the sampling state to the processing state. Referring now to FIG. 2B, in block 216, for each of the data packets intercepted in block 202, it is determined whether that data packet's header set possesses all of the characteristics contained in any of the shared header characteristic sets previously determined in block 210. Data packets having header sets that do not possess all of the characteristics contained any of the shared header characteristic sets are sent toward those data packets' destinations. As a result, those data packets are "filtered out" from the application layer message inspection and classification process that occurs in block 218.

For example, if network element 104 determines that a particular data packet does not possess all of the characteristics contained any of the shared header characteristic sets, then network element 104 sends the particular data packet toward the particular data packet's destination without ever inspecting or processing the contents of the particular data packet's payload portion.

For a more specific example, if a "purchase order" shared header characteristic set contains only a source IP address "A" characteristic and a destination IP address "B" characteristic, and a particular data packet's header set also indicates the source IP address "A" characteristic and the destination IP address "B" characteristic, then the particular data packet possesses all of the shared header characteristics contained in the "purchase order" shared characteristic set. However, if the particular data packet's header set indicates the source IP address "A" characteristic but not the destination IP address "B" characteristic, then the particular data packet does not possess all of the shared header characteristics contained in the "purchase order" shared characteristic set. Even so, the particular data packet's header set might still possess every shared header characteristic contained in some other shared characteristic set.

In block 218, application layer messages collectively contained in the payload portions of the remaining data packets are determined by inspecting the payload portions. Control passes to block 220. For example, network element 104 may inspect and assemble contents of payload portions of multiple TCP packets to construct multiple separate application layer messages. Each application layer message may be a separate XML document, for example.

In block 220, for each application layer message determined in block 218, a message classification to which that application layer message belongs, if any, is determined. Control passes to block 222. For example, for each such message, network element 104 may determine whether that message satisfies the criteria associated with the "purchase order" message classification, or the criteria associated with the "account transaction" message classification, or neither.

In block 222, for each application layer message that belongs to a message classification, one or more actions that are associated with the message classification to which that message belongs are performed at the network element. Control passes back to block 202 of FIG. 2A. For example, for each message that belongs to the "account transaction" message classification, network element 104 may perform a first set of actions that are associated with the "account transaction" message classification, and for each message that belongs to the "purchase order" message classification, network element 104 may perform a second set of actions that are associated with the "purchase order" message classification. These actions may include forwarding the messages towards a destination, such as server application 112 or server application 114. Some other possible actions are described below.

As a result of the above method, a network element can perform application layer message processing at a faster average rate. While in the processing state, a network element can examine determine whether the more resource-intensive application layer message processing needs to be performed relative to a particular data packet merely by examining the data packet's protocol headers instead of the entire contents of the data packet's payload portion. Because existing hardware can already perform protocol header inspection at high speeds, network performance is enhanced when protocol header inspection is the only kind of inspection that needs to be performed relative to at least a fraction of all data packets.

Since there are a wide variety of application messages, the administrator will not know about all possible combinations that need to be serviced by the device. Hence, the network element can gather metadata about all messages that came through the switch, and this can be used by the administrator to create new classifications.

3.0 Implementation Examples 3.1 Multi-Blade Architecture

Figure 6:
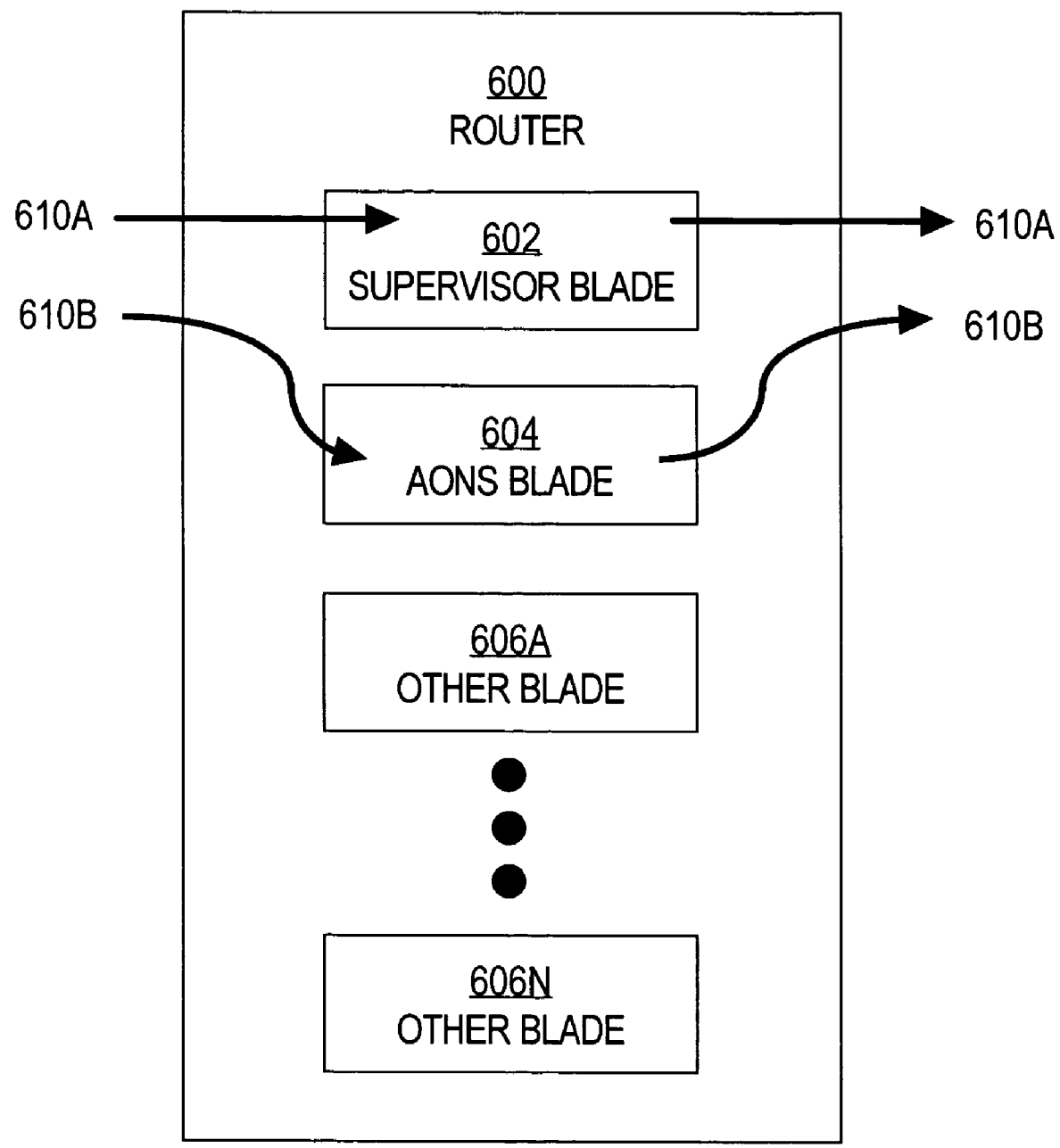
FIG. 6 is a block diagram that illustrates one embodiment of a router in which a supervisor blade directs some packet flows to an AONS blade and/or other blades.

According to one embodiment, an Application-Oriented Network Services (AONS) blade in a router performs some of the actions discussed above. FIG. 6 is a block diagram that illustrates one embodiment of a router 600 in which a supervisor blade 602 directs some of packet flows 610A-B to an AONS blade and/or other blades 606N. Router 600 comprises supervisor blade 602, AONS blade 604, and other blades 606A-N. Each of blades 602, 604, and 606A-N is a single circuit board populated with components such as processors, memory, and network connections that are usually found on multiple boards. Blades 602, 604, and 606A-N are designed to be addable to and removable from router 600. The functionality of router 600 is determined by the functionality of the blades therein. Adding blades to router 600 can augment the functionality of router 600, but router 600 can provide a lesser degree of functionality with fewer blades at a lesser cost if desired. One of more of the blades may be optional.

Router 600 receives packet flows such as packet flows 610A-B. More specifically, packet flows 610A-B received by router 600 are received by supervisor blade 602. Supervisor blade 602 may comprise a forwarding engine and/or a route processor such as those commercially available from Cisco Systems, Inc.

In one embodiment, while router 600 is in the sampling state, supervisor blade 602 copies data packets and sends the copies to AONS blade 604. While router 600 is in the sampling state, AONS blade 604 constructs application layer messages from the payload portions of the copies that AONS blade 604 receives. AONS blade 604 determines message classifications to which the application layer messages belong, if any. Based in part on the characteristics of the packet header sets of the copies that AONS blade 604 receives, AONS blade 604 determines shared header characteristics for each message classification, as described above with reference to FIG. 2.

AONS blade 604 performs operations relative to the application layer messages, and, depending on the outcome of the operations, may return the packets to supervisor blade 602. Supervisor blade 602 may send packets to other blades 606A-N before or after sending copies of the packets to AONS blade 604. Supervisor blade 602 performs routing functions relative to the packets and forwards the packets on toward the packets' destinations.

When router 600 switches from the sampling state to the processing state, AONS blade 604 communicates, to supervisor blade 602, the shared header characteristics determined for each message classification. While router 600 is in the processing state, supervisor blade receives 602 data packets and determines whether the packet header sets of those data packets possess all of the characteristics of any of the message classifications' shared header characteristics. While router 600 is in the processing state, supervisor blade 602 sends, to AONS blade 604, only those of the data packets that have packet header sets that possess all of the characteristics of at least one of the message classifications' shared header characteristics. Supervisor blade 602 may send other data packets to and receive the other data packets back from one or more of other blades 606A-N before sending the other data packets to their destinations.

Thus, while router 600 is in the processing state, AONS blade 604 receives and processes only those of the data packets that have packet header sets that possess all of the characteristics of at least one of the message classifications' shared header characteristics. As a result, AONS blade 604 may receive and process fewer data packets, thereby conserving the processing resources of router 600.

For example, supervisor blade 602 may determine that packet header sets in data packets in packet flow 610A do not possess all of the characteristics of any of the message classifications' shared header characteristics. Consequently, supervisor blade 602 performs routing function relative to the data packets in packet flow 610A and forwards those data packets on toward their destination.

For another example, supervisor blade 602 may determine that packet header sets in data packets in packet flow 610B possess all of the characteristics of at least one of the message classifications' shared header characteristics. Consequently, supervisor blade 602 sends, to AONS blade 604, the data packets in packet flow 610B. After receiving data packets back from AONS blade 604, supervisor blade 602 performs routing function relative to the data packets in packet flow 610B and forwards those data packets on toward their destination (which might have changed due to actions performed by AONS blade 604).

AONS blade 604 and other blades 606A-N receive packets from supervisor blade 602, perform operations relative to the packets, and return the packets to supervisor blade 602. Supervisor blade 602 may send packets to and receive packets from multiple blades before sending those packets out of router 600. For example, supervisor blade 602 may send a particular group of packets to other blade 606A. Other blade 606A may perform firewall functions relative to the packets and send the packets back to supervisor blade 602. Supervisor blade 602 may receive the packet from other blade 606A and send the packets to AONS blade 604. AONS blade 604 may perform one or more message payload-based operations relative to the packets and send the packets back to supervisor blade 602.

According to one embodiment, the following events occur at an AONS router such as router 600. First, packets, containing messages from clients to servers, are received. Next, access control list-based filtering is performed on the packets and some of the packets are sent to an AONS blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AONS message types. Next, a policy flow that corresponds to the AONS message type is selected. Next, the selected policy flow is executed. Then the packets are either forwarded, redirected, dropped, copied, or fanned-out as specified by the selected policy flow.

3.2 Processing Application Layer Messages while in the Processing State

Figure 3A:
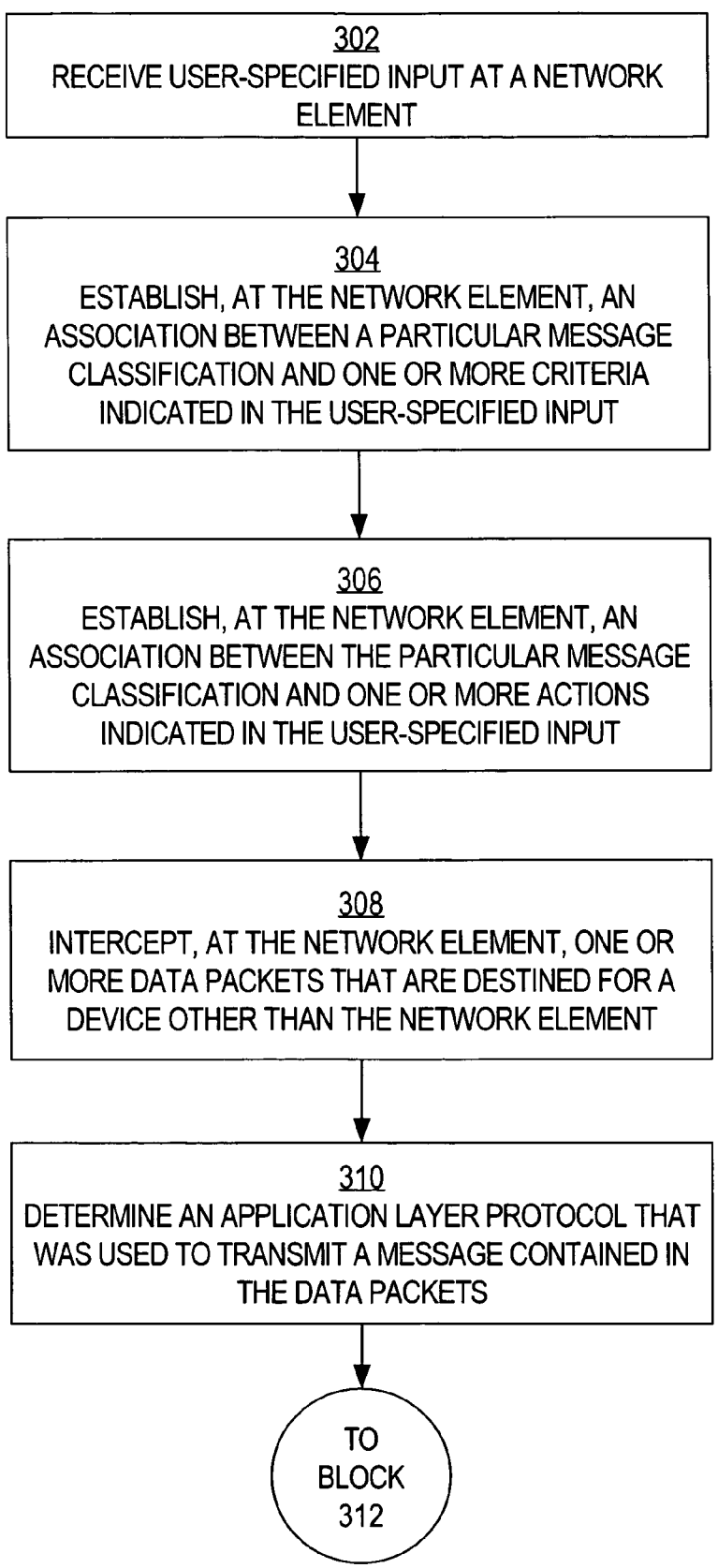
FIGS. 3A-B depict a flow diagram that illustrates one embodiment of a method of processing application layer messages at a network element while in the processing state.
Figure 3B:
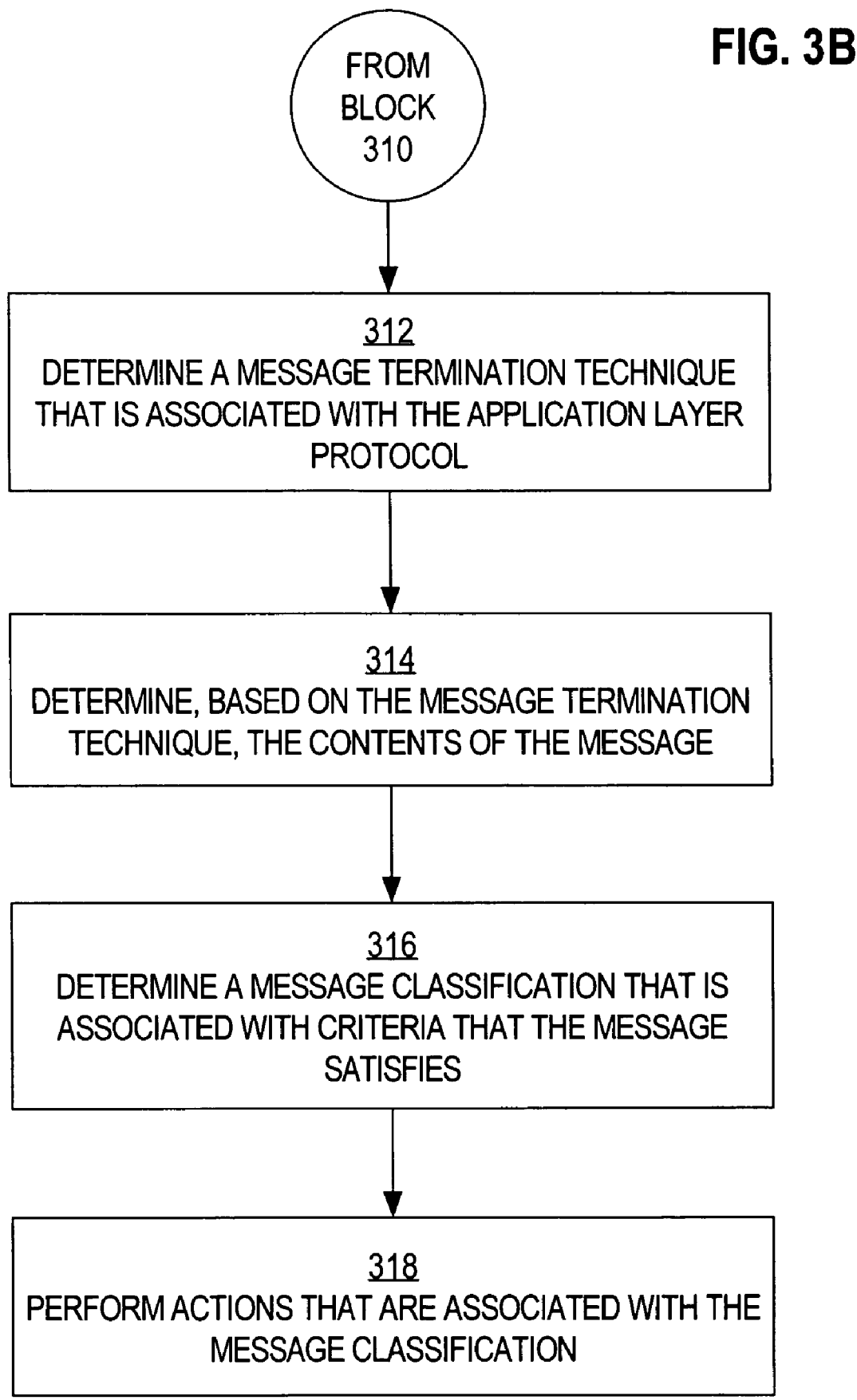

FIGS. 3A-B depict a flow diagram 300 that illustrates one embodiment of a method of processing application layer messages at a network element while in the processing state. For example, one or more of network elements 102, 104, 106, and 108 may perform such a method while in the processing state. More specifically, AONS blade 604 may perform one or more steps of such a method. Other embodiments may omit one or more of the operations depicted in flow diagram 300. Other embodiments may contain operations additional to the operation depicted in flow diagram 300. Other embodiments may perform the operations depicted in flow diagram 300 in an order that differs from the order depicted in flow diagram 300.

Referring first to FIG. 3A, in block 302, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, network element 104, and more specifically AONS blade 604, may receive such user-specified input from a network administrator.

In block 304, an association is established, at the network element, between the particular message classification and the one or more criteria. For example, AONS blade 604 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message in order for the message to belong to the associated message classification. For another example, the criteria may indicate one or more source IP addresses and/or destination IP addresses from or to which a message needs to be addressed in order for the message to belong to the associated message classification.

In block 306, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 604 may establish an association between a particular message classification and one or more actions. Collectively, the operations of blocks 302-306 comprise "provisioning" the network element.

In block 308, one or more data packets that are destined for a device other than the network element are intercepted by the network element. The data packets may be, for example, data packets that contain IP and TCP headers. The IP addresses indicated in the IP headers of the data packets differ from the network element's IP address; thus, the data packets are destined for a device other than the network element. For example, network element 104, and more specifically, supervisor blade 602, may intercept data packets that client application 110 originally sent. The data packets might be destined for server application 112, for example.

At this point, some of the data packets may be "filtered out" as described above with reference to FIG. 2. For example, supervisor blade 602 may perform the processing based on both (a) the characteristics of the packet header sets of the data packets and (b) shared header characteristics that supervisor blade 602 received from AONS blade 604 while router 600 was in the sampling state. Those of the data packets that are not "filtered out" continue through the operations of the following blocks.

In block 310, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, network element 104, and more specifically AONS blade 604, may store mapping information that maps FTP (an application layer protocol) to a first combination of IP addresses and/or TCP ports, and that maps HTTP (another application layer protocol) to a second combination of IP addresses and/or TCP ports. Based on this mapping information and the IP addresses and/or TCP ports indicated by the intercepted data packets, AONS blade 604 may determine which application layer protocol (FTP, HTTP, Simple Mail Transfer Protocol (SMTP), etc.) was used to transmit the message.

In block 312, a message termination technique that is associated with the application layer protocol used to transmit the message is determined. For example, AONS blade 604 may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, AONS blade 604 may determine which procedure should be called to extract the message from the data packets.

In block 314, the contents of the message are determined based on the termination technique that is associated with the application layer protocol that was used to transmit the message. For example, AONS blade 604 may provide the data packets as input to a procedure that is mapped to the application layer protocol determined in block 312. The procedure may use the appropriate message termination technique to extract the contents of the message from the data packets. The procedure may return the message as output to AONS blade 604. Thus, in one embodiment, the message extracted from the data packets is independent of the application layer protocol that was used to transmit the message.

In block 316, a message classification that is associated with criteria that the message satisfies is determined. For example, AONS blade 604 may store mapping information that maps different criteria to different message classifications. The mapping information indicates, among possibly many different associations, the association established in block 304. AONS blade 604 may determine whether the contents of the message satisfy criteria associated with any of the known message classifications. For example, a message classification might be associated with criteria that indicate that a message must be an XML document that contains a specified path within a hierarchical structure in order to belong to the message classification. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 318, one or more actions that are associated with the message classification determined in block 316 are performed. If two or more of the actions are associated with a specified order of performance, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. For example, an action might indicate that the message is to be dropped. In this case, the message is prevented from being forwarded out of the network element toward that message's destination. For another example, an action might indicate that a message is to be compressed using a specified compression technique before being forwarded out of the network element.

For another example, an action might indicate that the content of the message is to be altered in a specified manner. For example, an action might indicate that specified text is to be inserted into a specified location in the message. Such a location might be specified by a path in an XML hierarchical structure of the message, for example, or by a specified string of text occurring in the message. For another example, an action might indicate that specified text is to be deleted from the message. For another example, an action might indicate that specified text is to be substituted for other specified text in the message. Text inserted into the message might be obtained dynamically ("on the fly") from a database that is external to the network element.

For another example, an action might indicate that the message format of a message is to be altered in a specified manner. For example, an action might indicate that a message's format is to be changed from XML to some other format such as EDI. For another example, an action might indicate that a message's format is to be changed from some format other than XML into XML. The message format may be altered without altering the core content of the message, which is independent of the message format.

For another example, an action might indicate that the message is to be forwarded using a specified application layer protocol other than the application layer protocol that the message's origin used to transmit the message. For example, client application 110 might have used a first application layer protocol, such as HTTP, to transmit the message. Thus, when intercepted by network element 104, the message might have contained an HTTP header. However, in accordance with a specified action, before network element 104 forwards the message towards the message's destination, network element 104, and more specifically AONS blade 604, may modify the message so that the message will be carried using an application layer protocol other than HTTP (such as FTP, SMTP, etc.).

For another example, an action might indicate that the message's destination is to be altered so that the message will be forwarded towards a device that is different from the device that the message's source originally specified. For example, in accordance with a specified action, network element 104, and more specifically AONS blade 604, might encapsulate the message in one or more new IP data packets that indicate a new destination IP address that differs from the destination IP address that the originally intercepted IP data packets indicated. Network element 104 may then forward the new IP data packets toward the new destination. In this manner, message content-based routing may be achieved.

For another example, an action might indicate that a specified event is to be written into a specified log that might be external to the network element. For example, in accordance with a specified action, network element 104, and more specifically AONS blade 604, might write at least a portion of the message, along with the IP address from which the message was received, to a log file.

For another example, an action might indicate that the message is to be encrypted using a specified key before being forwarded to a destination. For example, in accordance with a specified action, network element 104, and more specifically AONS blade 604, might encrypt at least a portion of the message using a specified key and then forward data packets that contain the encrypted message towards the message's destination.

For another example, an action might indicate that a response cached at the network element is to be returned to the device from which the message originated, if such a response is cached at the network element. For example, network element 104, and more specifically AONS blade 604, may determine whether a response to the message is cached at network element 104; such a response might have be cached at network element 104 at the time a previous response to the same message passed through network element 104. If network element 104 determines that such a response is cached, then network element 104 may return the response to the message's origin. Consequently, network element 104 does not need to forward the message to the message's destination, and the message's destination does not need to issue another response to the message.

If the message was modified in some way (e.g., content, format, or protocol modification) during the performance of the actions, and if the modified message is supposed to be forwarded out of the network element, then the network element encapsulates the modified message into new data packets and sends the new data packets towards the modified message's destination—which also might have been modified.

A message might not belong to any known message classification. In this case, according to one embodiment, the network element does not perform any user-specified actions relative to the message. Instead, the network element simply forwards the data packets to the next hop along the path to the data packets' indicated destination.

As a result of the method illustrated in flow diagram 300, applications such as client application 110, server application 112, and server application 114 can communicate with each other as though no network elements acted as intermediaries, and as though each other application communicated using the same message format and application layer protocol.

3.3 Action Flows

Figure 4:
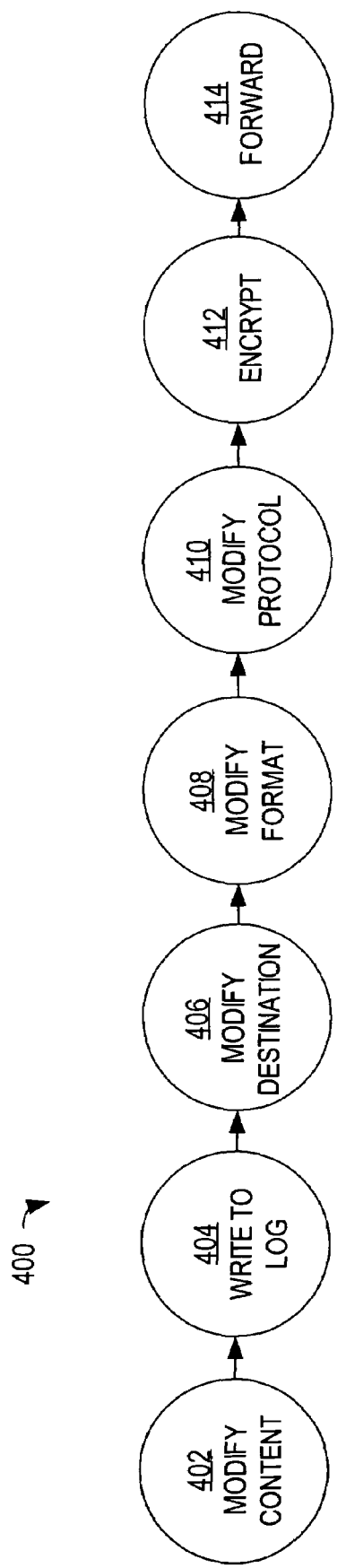
FIG. 4 depicts a sample flow that might be associated with a particular message classification.

FIG. 4 depicts a sample flow 400 that might be associated with a particular message classification. Flow 400 comprises, in order, actions 402-414; other flows may comprise one or more other actions. Action 402 indicates that the content of the message should be modified in a specified manner. Action 404 indicates that a specified event should be written to a specified log. Action 406 indicates that the message's destination should be changed to a specified destination. Action 408 indicates that the message's format should be translated into a specified message format. Action 410 indicates that the application layer protocol used to transmit the message should be changed to a specified application layer protocol. Action 412 indicates that the message should be encrypted using a particular key. Action 414 indicates that the message should be forwarded towards the message's destination.

In other embodiments, any one of actions 402-414 may be performed individually or in combination with any others of actions 402-414.

3.4 Aons Examples

3.4.1 Aons General Overview

Application-Oriented Network Systems (AONS) is a technology foundation for building a class of products that embed intelligence into the network to better meet the needs of application deployment. AONS complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AONS provides this enhanced support by understanding more about the content and context of information flow. As such, AONS works primarily at the message rather than at the packet level. Typically, AONS processing of information terminates a TCP connection to inspect the full message, including the "payload" as well as all headers. AONS also understands and assists with popular application-level protocols such as HTTP, FTP, SMTP and de facto standard middleware protocols.

AONS differs from middleware products running on general-purpose computing systems in that AONS' behavior is more akin to a network appliance, in its simplicity, total cost of ownership and performance. Furthermore, AONS integrates with network-layer support to provide a more holistic approach to information flow and management, mapping required features at the application layer into low-level networking features implemented by routers, switches, firewalls and other networking systems.

Although some elements of AONS-like functionality are provided in existing product lines from Cisco Systems, Inc., such products typically work off a more limited awareness of information, such as IP/port addresses or HTTP headers, to provide load balancing and failover solutions. AONS provides a framework for broader functional support, a broader class of applications and a greater degree of control and management of application data.

3.4.2 Aons Terminology

An "application" is a software entity that performs a business function either running on servers or desktop systems. The application could be a packaged application, software running on application servers, a legacy application running on a mainframe, or custom or proprietary software developed in house to satisfy a business need or a script that performs some operation. These applications can communicate with other applications in the same department (departmental), across departments within a single enterprise (intra enterprise), across an enterprise and its partners (inter-enterprise or B2B) or an enterprise and its customers (consumers or B2C). AONS provides value added services for any of the above scenanos.

An "application message" is a message that is generated by an application to communicate with another application. The application message could specify the different business level steps that should be performed in handling this message and could be in any of the message formats described in the section below. In the rest of the document, unless otherwise specified explicitly, the term "message" also refers to an application message.

An "AONS node" is the primary AONS component within the AONS system (or network). As described later, the AONS node can take the shape of a client proxy, server proxy or an intermediate device that routes application messages.

Each application message, when received by the first AONS node, gets assigned an AONS message ID and is considered to be an "AONS message" until that message gets delivered to the destination AONS node. The concept of the AONS message exists within the AONS cloud. A single application message may map to more than one AONS message. This may be the case, for example, if the application message requires processing by more than one business function. For example, a "LoanRequest" message that is submitted by a requesting application and that needs to be processed by both a "CreditCheck" application and a "LoanProcessing" application would require processing by more than one business function. In this example, from the perspective of AONS, there are two AONS messages: The "LoanRequest" to the "CreditCheck" AONS message from the requesting application to the CreditCheck application; and the "LoanRequest" to the "LoanProcessing" AONS message from the CreditCheck application to the LoanProcessing Application.

In one embodiment, AONS messages are encapsulated in an AONP (AON Protocol) header and are translated to a "canonical" format. Reliability, logging and security services are provided from an AONS message perspective.

The set of protocols or methods that applications typically use to communicate with each other are called "application access protocols" (or methods) from an AONS perspective. Applications can communicate to the AONS network (typically end point proxies: a client proxy and a server proxy) using any supported application access methods. Some examples of application access protocols include: IBM MQ Series, Java Message Service (JMS), TIBCO, Simple Object Access Protocol (SOAP) over Hypertext Transfer Protocol (HTTP)/HTTPS, and Simple Mail Transfer Protocol (SMTP). Details about various access methods are explained in later sections of this document.

There are a wide variety of "message formats" that are used by applications. These message formats may range from custom or proprietary formats to industry-specific formats to standardized formats. Extensible Markup Language (XML) is gaining popularity as a universal language or message format for applications to communicate with each other. AONS supports a wide variety of these formats.

In addition, AONS provides translation services from one format to another based on the needs of applications. A typical deployment might involve a first AONS node that receives an application message (the client proxy) translating the message to a "canonical" format, which is carried as an AONS message through the AONS network. The server proxy might translate the message from the "canonical" format to the format understood by the receiving application before delivering the message. For understanding some of the non-industry standard formats, a message dictionary may be used.

A node that performs the gateway functionality between multiple application access methods or protocols is called a "protocol gateway." An example of this would be a node that receives an application message through File Transfer Protocol (FTP) and sends the same message to another application as a HTTP post. In AONS, the client and server proxies are typically expected to perform the protocol gateway functionality.

If an application generates a message in Electronic Data Interchange (EDI) format and if the receiving application expects the message to be in an XML format, then the message format needs to be translated but the content of the message needs to be kept intact through the translation. In AONS, the end point proxies typically perform this "message format translation" functionality.

In some cases, even though the sending and receiving application use the same message format, the content needs to be translated for the receiving application. For example, if a United States-resident application is communicating with a United Kingdom-resident application, then the date format in the messages between the two applications might need to be translated (from mm/dd/yyyy to dd/mm/yyyy) even if the applications use the same data representation (or message format). This translation is called "content translation."

3.4.3 Aons Functional Overview

As defined previously, AONS can be defined as network-based intelligent intermediary systems that efficiently and effectively integrate business and application needs with more flexible and responsive network services.

In particular, AONS can be understood through the following characteristics:

AONS operates at a higher layer (layers 5-6) than traditional network element products (layers 2-4). AONS uses message-level inspection as a complement to packet-level inspection—by understanding application messages, AONS adds value to multiple network element products, such as switches, firewalls, content caching systems and load balancers, on the "message exchange route." AONS provides increased flexibility and granularity of network responsiveness in terms of security, reliability, traffic optimization (compression, caching), visibility (business events and network events) and transformation (e.g., from XML to EDI).

AONS is a comprehensive technology platform, not just a point solution. AONS can be implemented through distributed intelligent intermediary systems that sit between applications, middleware, and databases in a distributed intra- and inter-enterprise environment (routing messages, performing transformations, etc.). AONS provides a flexible framework for end user configuration of business flows and policies and partner-driven extensibility of AONS services.

AONS is especially well suited for network-based deployment. AONS is network-based rather than general-purpose server-based. AONS is hybrid software-based and hardware-based (i.e., application-specific integrated circuit (ASIC)/field programmable gate array (FPGA)-based acceleration).

AONS uses out-of-band or in-line processing of traffic, as determined by policy. AONS is deployed in standalone products (network appliances) as well as embedded products (service blades for multiple switching, routing, and storage platforms).

3.4.4 Aons System Overview

Figure 7:
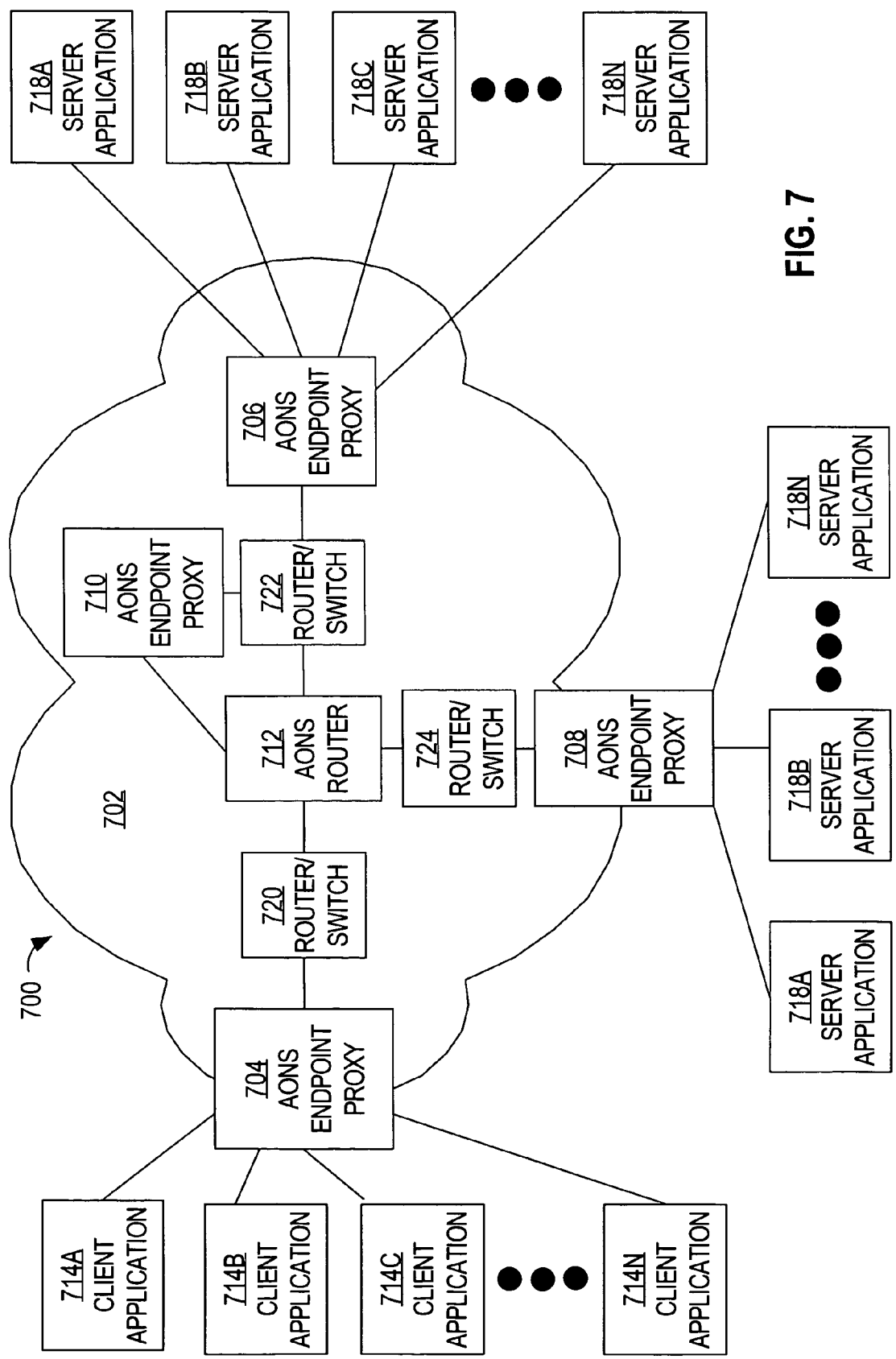
FIG. 7 is a diagram that illustrates the various components involved in an AONS network according to one embodiment.

This section outlines the system overview of an example AONS system. FIG. 7 is a diagram 700 that illustrates the various components involved in an example AONS network 702 according to one embodiment of the invention. The roles performed by each of the nodes are mentioned in detail in subsequent sections.

Within AONS network 702, key building blocks include AONS Endpoint Proxies (AEPs) 704-710 and an AONS Router (AR). Visibility into application intent may begin within AEP 704 placed at the edge of a logical AONS "cloud." As a particular client application of client applications 714A-N attempts to send a message across the network to a particular server application destination of server applications 716A-N and 718A-N, the particular client application will first interact with AEP 704.

AEP 704 serves as either a transparent or explicit messaging gateway which aggregates network packets into application messages and infers the message-level intent by examining the header and payload of a given message, relating the message to the appropriate context, optionally applying appropriate policies (e.g. message encryption, transformation, etc.) and then routing the message towards the message's application destination via a network switch.

AONS Router (AR) 712 may intercept the message en route to the message's destination endpoint. Based upon message header contents, AR 712 may determine that a new route would better serve the needs of a given application system. AR 712 may make this determination based upon enterprise-level policy, taking into account current network conditions. As the message nears its destination, the message may encounter AEP 706, which may perform a final set of operations (e.g. message decryption, acknowledgement of delivery) prior to the message's arrival. In one embodiment, each message is only parsed once: when the message first enters the AONS cloud. It is the first AEP that a message traverses that is responsible for preparing a message for optimal handling within the underlying network.

AEPs 704-708 can further be classified into AEP Client Proxies and AEP Server Proxies to explicitly highlight roles and operations performed by the AEP on behalf of the specific end point applications.

A typical message flow involves a particular client application 714A submitting a message to the AEP Client Proxy (CP) 704 through one of the various access protocols supported by AONS. On receiving this message, AEP CP 704 assigns an AONS message id to the message, encapsulates the message with an AONP header, and performs any necessary operations related to the AONS network (e.g. security and reliability services). Also, if necessary, the message is converted to a "canonical" format by AEP CP 704. The message is carried over a TCP connection to AR 710 along the path to the destination application 718A. The AONS routers along the path perform the infrastructure services necessary for the message and can change the routing based on the policies configured by the customer. The message is received at the destination AEP Server Proxy (SP) 706. AEP SP 706 performs necessary security and reliability functions and translates the message to the format that is understood by the receiving application, if necessary. AEP SP 706 then sends the message to receiving application 718A using any of the access protocols that application 718A and AONS support. A detailed message flow through AONS network 702 is described in later sections.

3.4.5 Aons System Elements

This section outlines the different concepts that are used from an AONS perspective.

An "AEP Client Proxy" is an AONS node that performs the services necessary for applications on the sending side of a message (a client). In the rest of this document, an endpoint proxy also refers to a client or server proxy. The typical responsibilities of the client proxy in processing a message are: message pre-classification & early rejection, protocol management, message identity management, message encapsulation in an AONP header, end point origination for reliable delivery, security end point service origination (encryption, digital signature, authentication), flow selection & execution/infrastructure services (logging, compression, content transformation, etc.), routing—next hop AONS node or destination, AONS node and route discovery/advertising role and routes, and end point origination for the reliable delivery mechanism (guaranteed delivery router).

Not all functionalities described above need to be performed for each message. The functionalities performed on the message are controlled by the policies configured for the AONS node.

An "AEP Server Proxy" is an AONS node that performs the services necessary for applications on the receiving side of a message (a server). In the rest of the document, a Server Proxy may also be referred as an end point proxy. The typical responsibilities of the Server Proxy in processing a message are: protocol management, end point termination for reliable delivery, security end point service termination (decryption, verification of digital signature, etc.), flow selection & execution/infrastructure services (logging, compression, content translation, etc.), message de-encapsulation in AONP header, acknowledgement to sending AONS node, application routing/request message delivery to destination, response message correlation, and routing to entry AONS node.

Note that not all the functionalities listed above need to be performed for each message. The functionalities performed on the message are controlled by the policies configured for the AONS node and what the message header indicates.

An "AONS Router" is an AONS node that provides message-forwarding functionalities along with additional infrastructure services within an AONS network. An AONS Router communicates with Client Proxies, Server Proxies and other AONS Routers. An AONS Router may provide service without parsing a message; an AONS Router may rely on an AONP message header and the policies configured in the AONS network instead of parsing messages. An AONS Router provides the following functionalities: scalability in the AONS network in terms of the number of TCP connections needed; message routing based on message destination, policies configured in the AONS cloud, a route specified in the message, and/or content of the message; a load at the intended destination—re-routing if needed; availability of the destination—re-routing if needed; cost of transmission (selection among multiple service providers); and infrastructure services such as sending to a logging facility, sending to a storage area network (SAN) for backup purposes, and interfacing to a cache engine for cacheable messages (like catalogs).

AONS Routers do not need to understand any of the application access protocols and, in one embodiment, deal only with messages encapsulated with an AONP header.

Application-Oriented Networking Protocol (AONP) is a protocol used for communication between the nodes in an AONS network. In one embodiment, each AONS message carries an AONP header that conveys the destination of the message and additional information for processing the message in subsequent nodes. AONP also addresses policy exchange (static or dynamic), fail-over among nodes, load balancing among AONS nodes, and exchange of routing information. AONP also enables application-oriented message processing in multiple network elements (like firewalls, cache engines and routers/switches). AONP supports both a fixed header and a variable header (formed using type-length-value (TLV) fields) to support efficient processing in intermediate nodes as well as flexibility for additional services.

Unless explicitly specified otherwise, "router" or "switch" refers herein to a typical Layer 3 or Layer 2 switch or a router that is currently commercially available.

3.4.6 Aons Example Features

In one embodiment, an underlying "AONS foundation platform of subsystem services" (AOS) provides a range of general-purpose services including support for security, compression, caching, reliability, policy management and other services. On top of this platform, AONS then offers a range of discreet functional components that can be wired together to provide the overall processing of incoming data traffic. These "bladelets™" are targeted at effecting individual services in the context of the specific policy or action demanded by the application or the information technology (IT) manager. A series of access method adaptors ensure support for a range of ingress and egress formats. Finally, a set of user-oriented tools enable managers to appropriately view, configure and set policies for the AONS solution. These four categories of functions combine to provide a range of end-customer capabilities including enhanced security, infrastructure optimization, business continuity, application integration and operational visibility.

The enhanced visibility and enhanced responsiveness enabled by AONS solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AONS can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). The individual features belonging to each of these primary categories are described in greater detail below.

3.4.6.1 Enhances Security and Reliability

Authentication: AONS can verify the identity of the sender of an inbound message based upon various pieces of information contained within a given message (username/password, digital certificate, Security Assertion Markup Language (SAML) assertion, etc.), and, based upon these credentials, determine whether or not the message should be processed further.

Authorization: Once principal credentials are obtained via message inspection, AONS can determine what level of access the originator of the message should have to the services it is attempting to invoke. AONS may also make routing decisions based upon such derived privileges or block or mask certain data elements within a message once it's within an AONS network as appropriate.

Encryption/Decryption: Based upon policy, AONS can perform encryption of message elements (an entire message, the message body or individual elements such as credit card number) to maintain end-to-end confidentiality as a message travels through the AONS network. Conversely, AONS can perform decryption of these elements prior to arrival at a given endpoint.

Digital Signatures: In order to ensure message integrity and allow for non-repudiation of message transactions, AONS can digitally sign entire messages or individual message elements at any given AEP. The decision as to what gets signed will be determined by policy as applied to information derived from the contents and context of each message.

Reliability: AONS can complement existing guaranteed messaging systems by intermediating between unlike proprietary mechanisms. It can also provide reliability for HTTP-based applications (including web services) that currently lack reliable delivery. As an additional feature, AONS can generate confirmations of successful message delivery as well as automatically generate exception responses when delivery cannot be confirmed.

3.4.6.2 Infrastructure Optimization

Compression: AEPs can compress message data prior to sending the message data across the network in order to conserve bandwidth and conversely decompress it prior to endpoint delivery.

Caching: AONS can cache the results of previous message inquires based upon the rules defined for a type of request or based upon indicators set in the response. Caching can be performed for entire messages or for certain elements of a message in order to reduce application response time and conserve network bandwidth utilization. Message element caching enables delta processing for subsequent message requests.

TCP Connection Pooling: By serving as an intermediary between message clients and servers AONS can consolidate the total number of persistent connections required between applications. AONS thereby reduces the client and server-processing load otherwise associated with the ongoing initiation and teardown of connections between a mesh of endpoints.

Batching: An AONS intermediary can batch transactional messages destined for multiple destinations to reduce disk I/O overheads on the sending system. Similarly, transactional messages from multiple sources can be batched to reduce disk I/O overheads on the receiving system.

Hardware Acceleration: By efficiently performing compute-intensive functions such as encryption and Extensible Stylesheet Language Transformation (XSLT) transformations in an AONS network device using specialized hardware, AONS can offload the computing resources of endpoint servers, providing potentially lower-cost processing capability.

Quality of Service: AONS can integrate application-level QoS with network-level QoS features based on either explicit message prioritization (e.g., a message tagged as "high priority") or via policy that determines when a higher quality of network service is required for a message as specific message content is detected.

Policy Enforcement: At the heart of optimizing the overall AONS solution is the ability to ensure business-level polices are expressed, implemented and enforced by the infrastructure. The AONS Policy Manager ensures that once messages are inspected, the appropriate actions (encryption, compression, routing, etc.) are taken against that message as appropriate.

3.4.6.3 Activity Monitoring and Management

Auditing/Logging/Metering: AONS can selectively filter messages and send them to a node or console for aggregation and subsequent analysis. Tools enable viewing and analysis of message traffic. AONS can also generate automatic responses to significant real-time events, both business and infrastructure-related. By intelligently gathering statistics and sending them to be logged, AONS can produce metering data for auditing or billing purposes.

Management: AONS can combine both message-level and network infrastructure level events to gain a deeper understanding of overall system health. The AONS management interface itself is available as a web service for those who wish to access it programmatically.

Testing and Validation: AONS' ability to intercept message traffic can be used to validate messages before allowing them to reach destination applications. In addition to protecting from possible application or server failures, this capability can be leveraged to test new web services and other functions by examining actual message flow from clients and servers prior to production deployment. AONS also provides a "debug mode" that can be turned on automatically after a suspected failure or manually after a notification to assist with the overall management of the device.

Workload Balancing and Failover: AONS provides an approach to workload balancing and failover that is both policy- and content-driven. For example, given an AONS node's capability to intermediate between heterogeneous systems, the AONS node can balance between unlike systems that provide access to common information as requested by the contents of a message. AONS can also address the issue of message affinity necessary to ensure failover at the message rather than just the session level as is done by most existing solutions. Balancing can also take into account the response time for getting a message reply, routing to an alternate destination if the preferred target is temporarily slow to respond.

Business Continuity: By providing the ability to replicate inbound messages to a remote destination, AONS enables customers to quickly recover from system outages. AONS can also detect failed message delivery and automatically re-route to alternate endpoints. AONS AEPs and ARs themselves have built-in redundancy and failover at the component level and can be clustered to ensure high availability.

3.4.6.4 Content-Based Routing and Transformation

Content-based Routing: Based upon its ability to inspect and understand the content and context of a message, AONS provides the capability to route messages to an appropriate destination by matching content elements against pre-established policy configurations. This capability allows AONS to provide a common interface (service virtualization) for messages handled by different applications, with AONS examining message type or fields in the content (part number, account type, employee location, customer zip code, etc.) to route the message to the appropriate application. This capability also allows AONS to send a message to multiple destinations (based on either statically defined or dynamic subscriptions to message types or information topics), with optimal fan-out through AONS routers. This capability further allows AONS to redirect all messages previously sent to an application so that it can be processed by a new application. This capability additionally allows AONS to route a message for a pre-processing step that is deemed to be required before receipt of a message (for example, introducing a management pre-approval step for all travel requests).

Thus capability also allows AONS to route a copy of a message that exceeds certain criteria (e.g. value of order) to an auditing system, as well as forwarding the message to the intended destination. This capability further allows AONS to route a message to a particular server for workload or failover reasons. This capability also allows AONS to route a message to a particular server based on previous routing decisions (e.g., routing a query request based on which server handled for the original order). This capability additionally allows AONS to route based on the source of a message. This capability also allows AONS to route a message through a sequence of steps defined by a source or previous intermediary.

Message Protocol Gateway: AONS can act as a gateway between applications using different transport protocols. AONS supports open standard protocols (e.g. HTTP, FTP, SMTP), as well as popular or de facto standard proprietary protocols such as IBM Websphere MQ.

Message Transformations: AONS can transform the contents of a message to make them appropriate for a particular receiving application. This can be done for both XML and non-XML messages, the latter via the assistance of either a message dictionary definition or a well-defined industry standard format.

3.4.7 Aons Functional Modules

Figure 8:
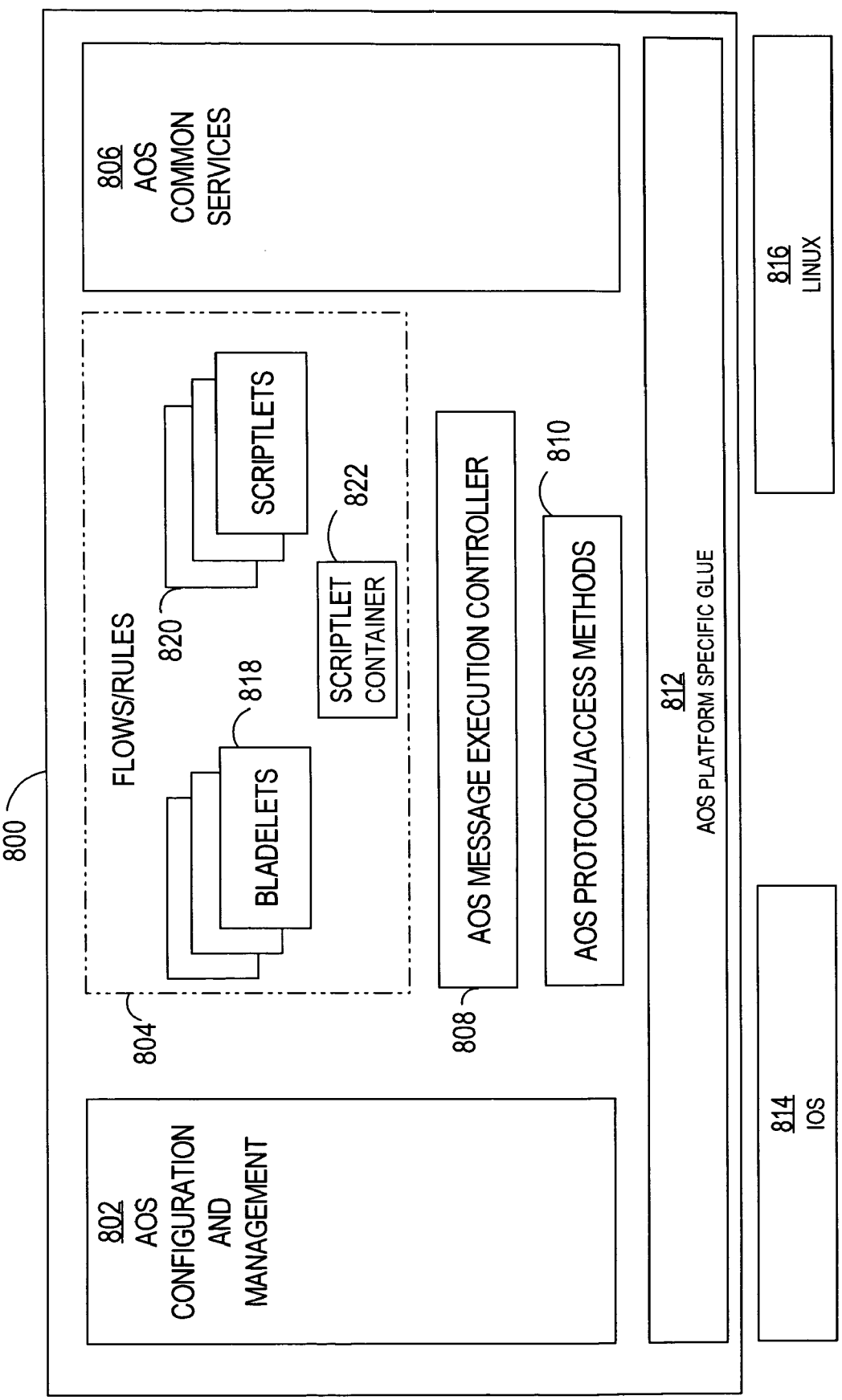
FIG. 8 is a block diagram that depicts functional modules within an example AONS node.

FIG. 8 is a block diagram that depicts functional modules within an example AONS node. AONS node 800 comprises AOS configuration and management module 802, flows/rules 804, AOS common services 806, AOS message execution controller 808, AOS protocol access methods 810, and AOS platform-specific "glue" 812. AONS node 800 interfaces with Internetworking Operating System (IOS) 814 and Linux Operating System 816. Flows/rules 804 comprise bladelets™ 818, scriptlets™ 820, and scriptlet™ container 822.

In one embodiment, AOS common services 806 include: security services, standard compression services, delta compression services, caching service, message logging service, policy management service, reliable messaging service, publish/subscribe service, activity monitoring service, message distribution service, XML parsing service, XSLT transformation service, and QoS management service.

In one embodiment, AOS protocol/access methods 810 include: TCP/SSL, HTTP/HTTPS, SOAP/HTTP, SMTP, FTP, JMS/MQ and JMS/RV, and Java Database Connectivity (JDBC).

In one embodiment, AOS message execution controller 808 includes: an execution controller, a flow subsystem, and a bladelet™ subsystem.

In one embodiment, AOS bladelets™ 818 and scriptlets™ 820 include: message input (read message), message output (send message), logging/audit, decision, external data access, XML parsing, XML transformation, caching, scriptlet container, publish, subscribe, message validation (schema, format, etc.), filtering/masking, signing, authentication, authorization, encryption, decryption, activity monitoring sourcing, activity monitoring marking, activity monitoring processing, activity monitoring notification, message discard, firewall block, firewall unblock, message intercept, and message stop-intercept.

In one embodiment, AOS configuration and management module 802 includes: configuration, monitoring, topology management, capability exchange, failover redundancy, reliability/availability/serviceability (RAS) services (tracing, debugging, etc.), archiving, installation, upgrades, licensing, sample scriptlets™, sample flows, documentation, online help, and language localization.

In one embodiment, supported platforms include: Cisco Catalyst 6503, Cisco Catalyst 6505, Cisco Catalyst 6509, and Cisco Catalyst 6513. In one embodiment, supported supervisor modules include: Sup2 and Sup720. In one embodiment, specific functional areas relating to the platform include: optimized TCP, SSL, public key infrastructure (PKI), encryption/decryption, interface to Cat6K supervisor, failover/redundancy, image management, and QoS functionality.

3.4.8 Aons Modes of Operation

AONS may be configured to run in multiple modes depending on application integration needs, and deployment scenarios. According to one embodiment, the primary modes of operation include implicit mode, explicit mode, and proxy mode. In implicit mode, an AONS node transparently intercepts relevant traffic with no changes to applications. In explicit mode, applications explicitly address traffic to an intermediary AONS node. In proxy mode, applications are configured to work in conjunction with AONS nodes, but applications do not explicitly address traffic to AONS nodes.

In implicit mode, applications are unaware of AONS presence. Messages are address to receiving applications. Messages are redirected to AONS via configuration of application "proxy" or middleware systems to route messages to AONS, and/or via configuration of networks (packet interception). For example, domain name server (DNS)-based redirection could be used to route messages. For another example, a 5-tuple-based access control list (ACL) on a switch or router could be used. Network-based application recognition and content switching modules may be configured for URL/URI redirection. Message-based inspection may be used to determine message types and classifications. In implicit mode, applications communicate with each other using AONS as an intermediary (implicitly), using application-native protocols.

Figure 9:
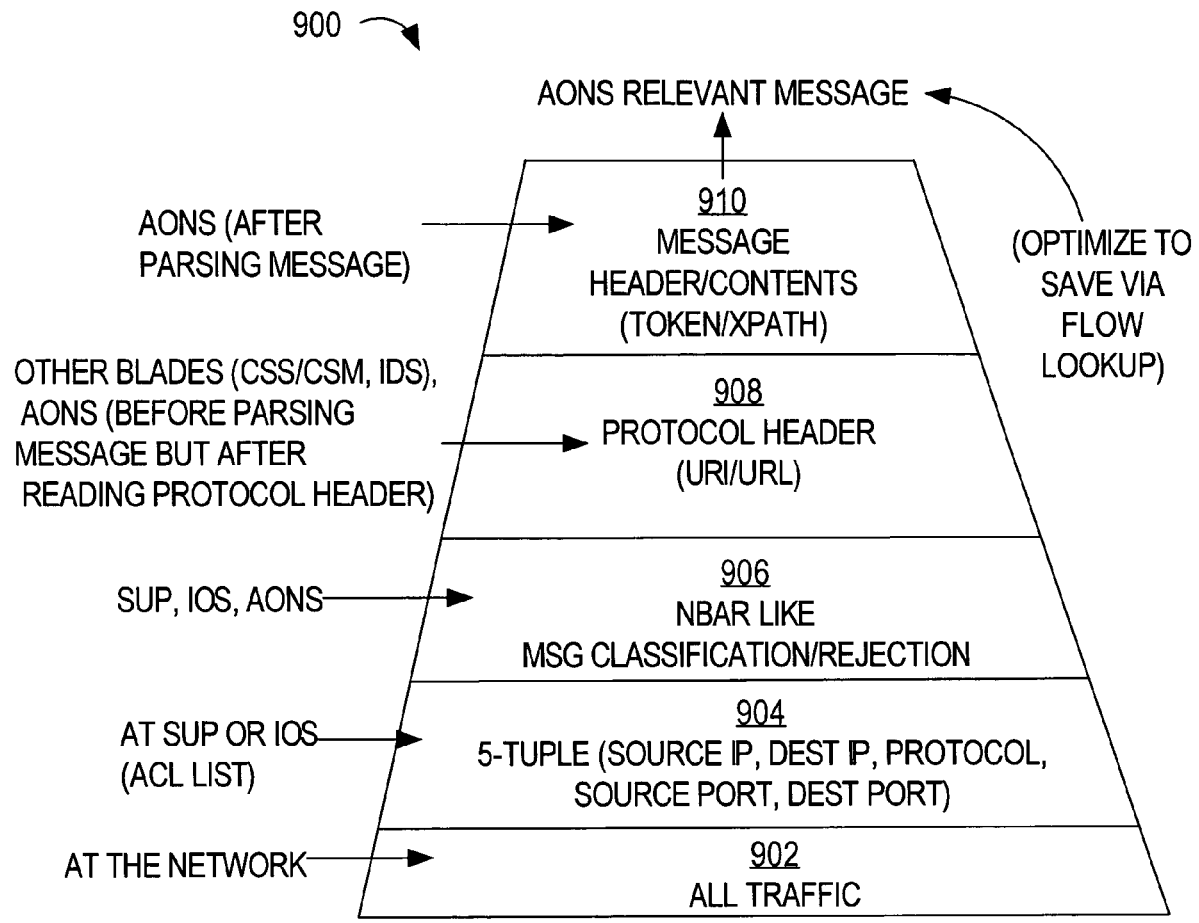
FIG. 9 is a diagram that shows multiple tiers of filtering that may be performed on message traffic in order to produce only a select set of traffic that will be processed at the AONS layer.

Traffic redirection, message classification, and "early rejection" (sending traffic out of AONS layers prior to complete processing within AONS layers) may be accomplished via a variety of mechanisms, such as those depicted in FIG. 9. FIG. 9 shows multiple tiers of filtering that may be performed on message traffic in order to produce only a select set of traffic that will be processed at the AONS layer. Traffic that is not processed at the AONS layer may be treated as any other traffic.

At the lowest layer, layer 902, all traffic passes through. At the next highest layer, layer 904, traffic may be filtered based on 5-tuples. A supervisor blade or Internetwork Operating System (IOS) may perform such filtering. Traffic that passes the filters at layer 904 passes to layer 906. At layer 906, traffic may be further filtered based on network-based application recognition-like filtering and/or message classification and rejection. Traffic that passes the filters at layer 906 passes to layer 908. At layer 908, traffic may be further filtered based on protocol headers. For example, traffic may be filtered based on URLs/URIs in the traffic. Traffic that passes the filters at layer 908 passes to layer 910. At layer 910, traffic may be processed based on application layer messages, include headers and contents. For example, XPath paths within messages may be used to process traffic at layer 910. An AONS blade may perform processing at layer 910. Thus, a select subset of all network traffic may be provided to an AONS blade.

In explicit mode, applications are aware of AONS presence. Messages are explicitly addressed to AONS nodes. Applications may communicate with AONS using AONP. AONS may perform service virtualization and destination selection.

In proxy mode, applications are explicitly unaware of AONS presence. Messages are addressed to their ultimate destinations (i.e., applications). However, client applications are configured to direct traffic via a proxy mode.

3.4.9 Aons Message Routing

Components of message management in AONS may be viewed from two perspectives: a node view and a cloud view.

Figure 10:
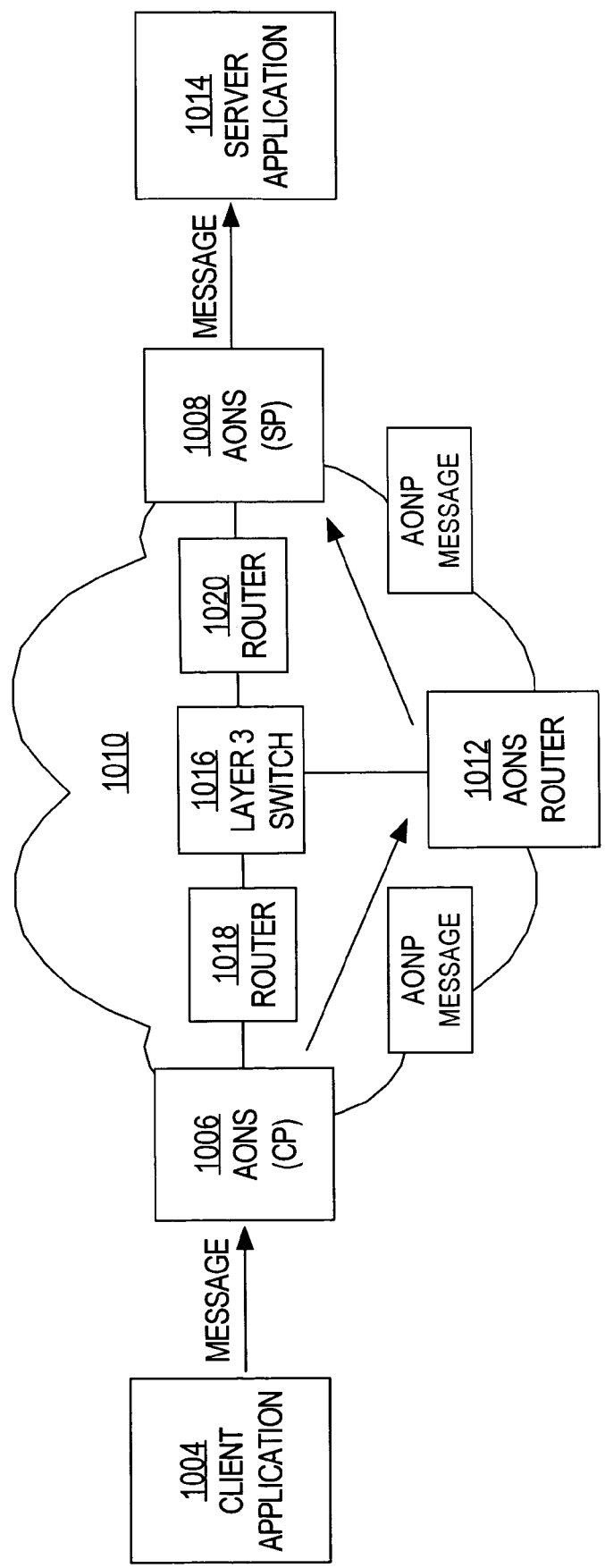
FIG. 10 is a diagram that illustrates the path of a message within an AONS cloud according to a cloud view.

FIG. 10 is a diagram that illustrates the path of a message within an AONS cloud 1010 according to a cloud view. A client application 1004 sends a message to an AONS Client Proxy (CP) 1006. If AONS CP 1006 is not present, then client application 1004 may send the message to an AONS Server Proxy (SP) 1008. The message is processed at AONS CP 1006. AONS CP 1006 transforms the message into AONP format if the message is entering AONS cloud 1010.

Within AONS cloud 1010, the message is routed using AONP. Thus, using AONP, the message may be routed from AONS CP 1006 to an AONS router 1012, or from AONS CP 1006 to AONS SP 1008, or from AONS router 1012 to another AONS router, or from AONS router 1012 to AONS SP 1008. Messages processed at AONS nodes are processed in AONP format.

When the message reaches AONS SP 1008, AONS SP 1008 transforms the message into the message format used by server application 1014. AONS SP 1008 routes the message to server application 1014 using the message protocol of server application 1014. Alternatively, if AONS SP 1008 is not present, AONS CP 1006 may route the message to server application 1014.

The details of the message processing within AONS cloud 1010 can be understood via the following perspectives: Request/Response Message Flow, One-Way Message Flow, Message Flow with Reliable Delivery, and Node-to-Node Communication.

Figure 11A:
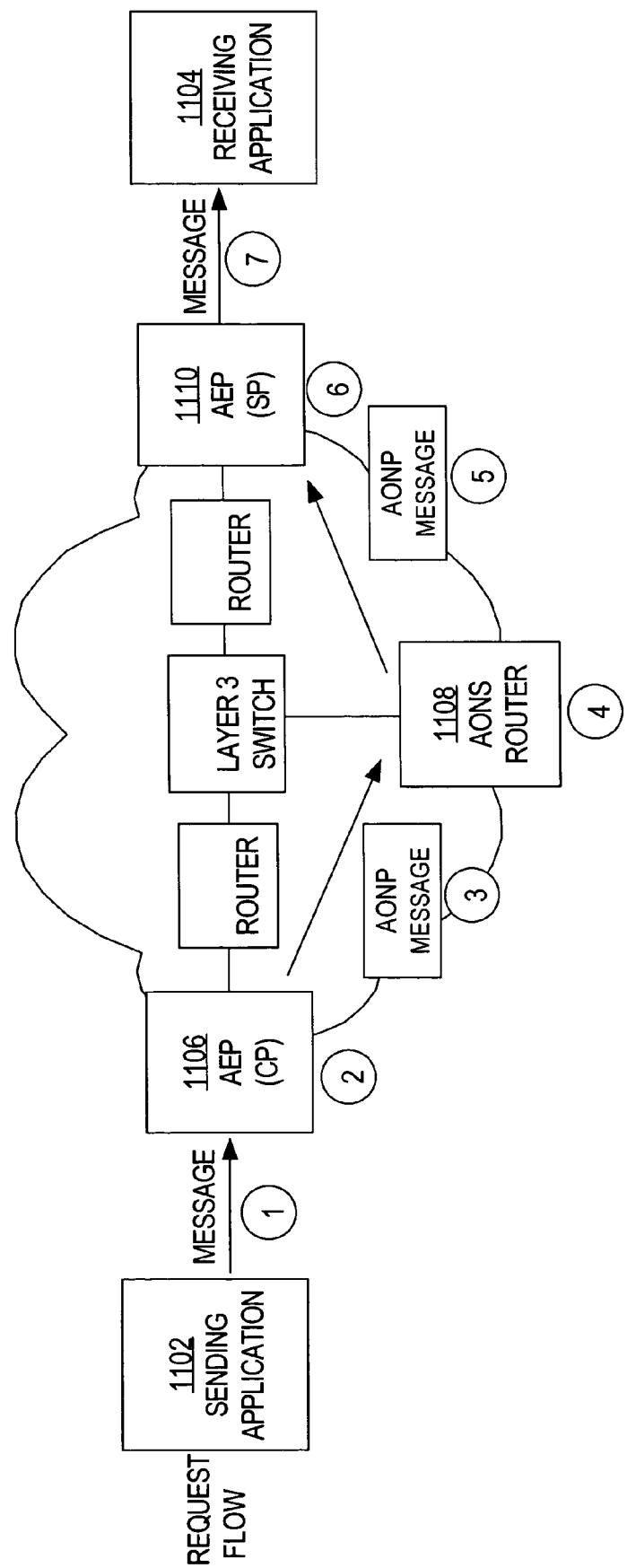
FIG. 11A and FIG. 11B are diagrams that illustrate a request/response message flow.
Figure 11B:
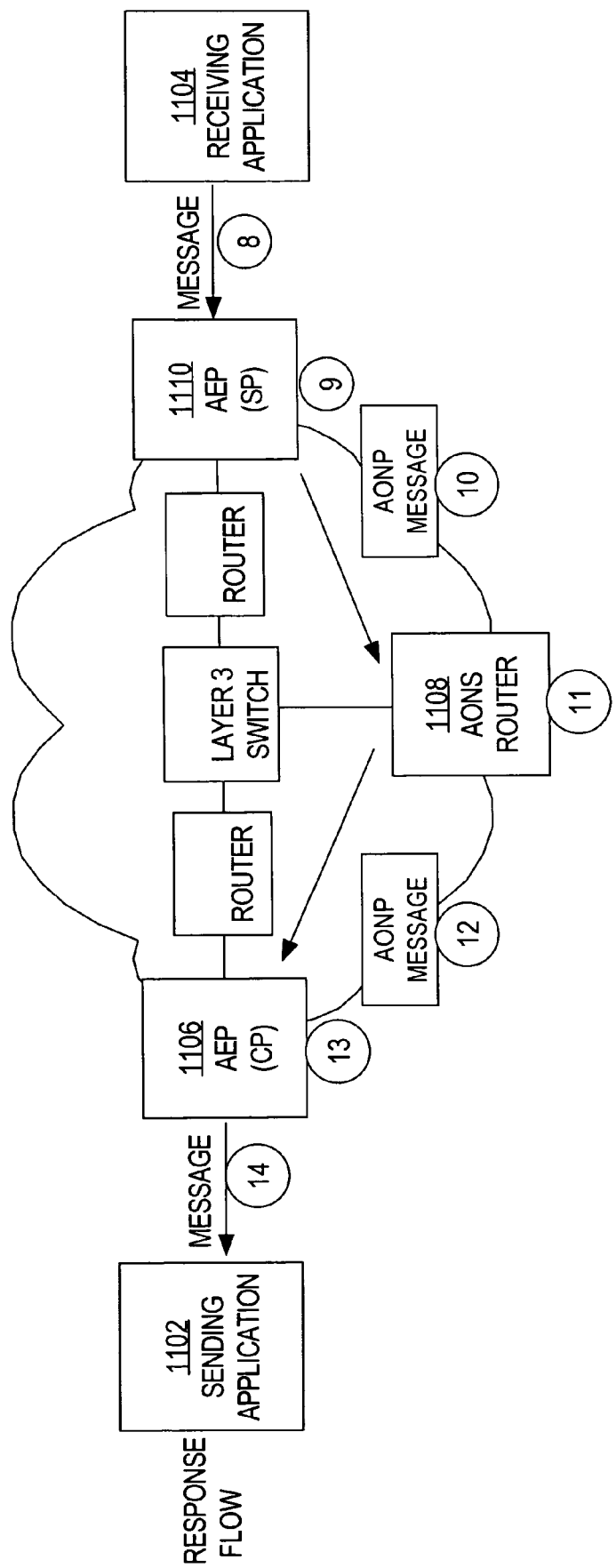

FIG. 11A and FIG. 11B are diagrams that illustrate a request/response message flow. Referring to FIG. 11A, at circumscribed numeral 1, a sending application 1102 sends a message towards a receiving application 1104. At circumscribed numeral 2, an AEP CP 1106 intercepts the message and adds an AONP header to the message, forming an AONP message. At circumscribed numeral 3, AEP CP 1106 sends the AONP message to an AONS router 1108. At circumscribed numeral 4, AONS router 1108 receives the AONP message. At circumscribed numeral 5, AONS router 1108 sends the AONP message to an AEP SP 1110. At circumscribed numeral 6, AEP SP 1110 receives the AONP message and removes the AONP header from the message, thus decapsulating the message. At circumscribed numeral 7, AEP SP 1110 sends the message to receiving application 1104.

Referring to FIG. 11B, at circumscribed numeral 8, receiving application 1104 sends a response message toward sending application 1102. At circumscribed numeral 9, AEP SP 1110 intercepts the message and adds an AONP header to the message, forming an AONP message. At circumscribed numeral 10, AEP SP 1110 sends the AONP message to AONS router 1108. At circumscribed numeral 11, AONS router 1108 receives the AONP message. At circumscribed numeral 12, AONS router 1108 sends the AONP message to AEP CP 1106. At circumscribed numeral 13, AEP CP 1106 receives the AONP message and removes the AONP header from the message, thus decapsulating the message. At circumscribed numeral 14, AEP CP 1106 sends the message to sending application 1102. Thus, a request is routed from sending application 1102 to receiving application 1104, and a response is routed from receiving application 1104 to sending application 1102.

Figure 12A:
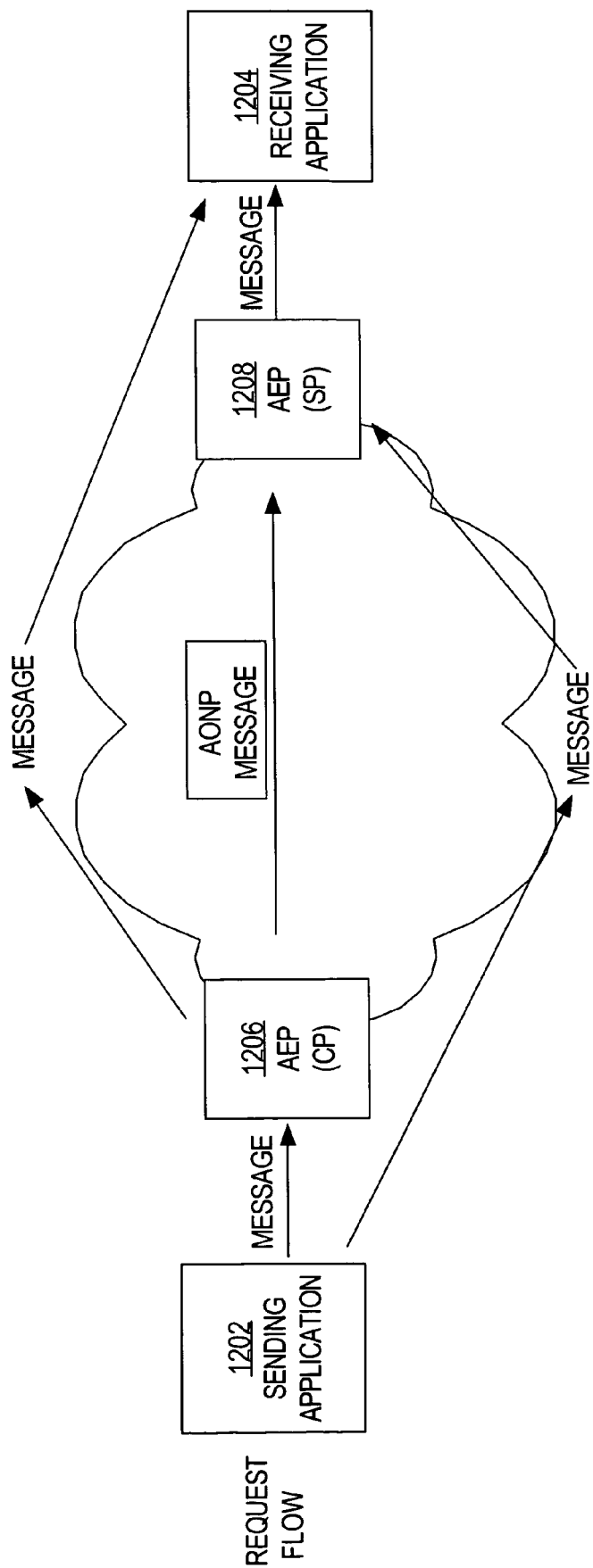
FIG. 12A and FIG. 12B are diagrams that illustrate alternative request/response message flows.
Figure 12B:
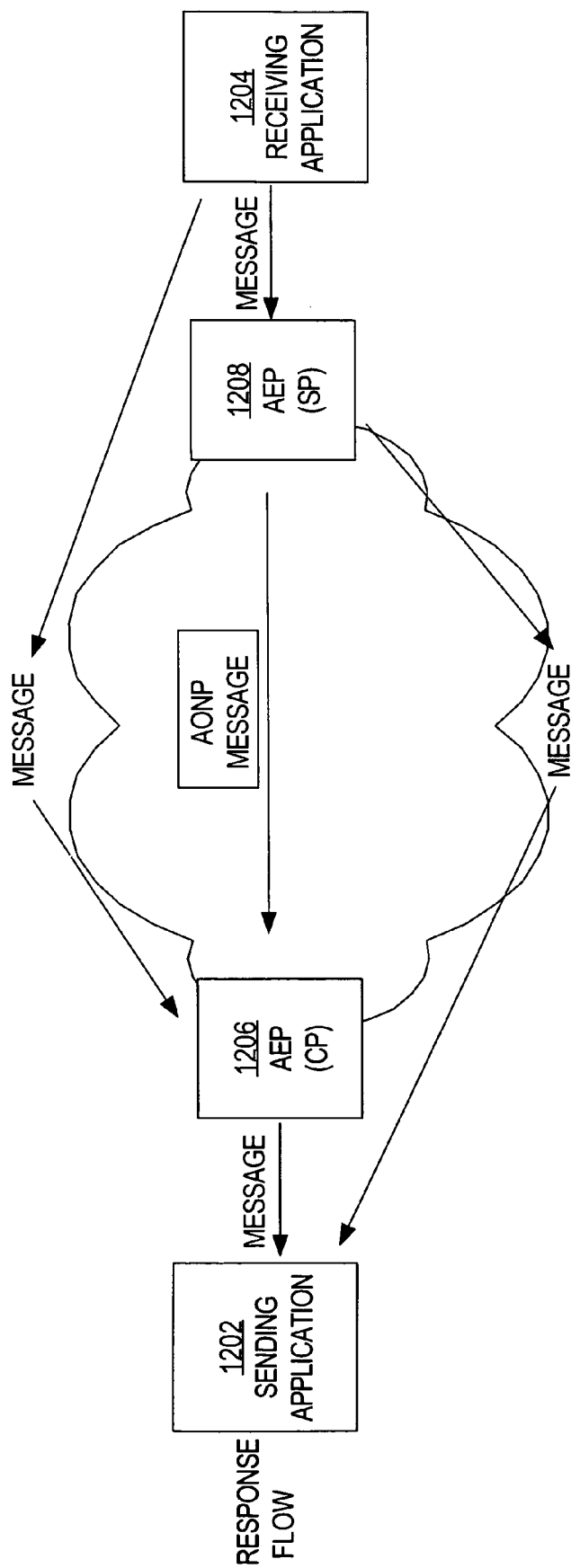

FIG. 12A and FIG. 12B are diagrams that illustrate alternative request/response message flows. FIG. 12A shows three possible routes that a message might take from a sending application 1202 to a receiving application 1204. According to a first route, sending application 1202 sends the message toward receiving application 1204, but an AEP CP 1206 intercepts the message and sends the message to receiving application 1204. According to a second route, sending application 1202 sends the message toward receiving application 1204, but AEP CP 1206 intercepts the message, encapsulates the message within an AONP message, and sends the AONP message to an AEP SP 1208, which decapsulates the message from the AONP message and sends the message to receiving application 1204. According to a third route, sending application 1202 sends the message toward receiving application 1204, but AEP SP 1208 intercepts the message and sends the message to receiving application 1204.

FIG. 12B shows three possible routes that a response message might take from receiving application 1204 to sending application 1202. According to a first route, receiving application 1204 sends the message toward sending application 1202, but AEP CP 1206 intercepts the message and sends the message to sending application 1204. According to a second route, receiving application 1204 sends the message toward sending application 1202, but AEP SP 1208 intercepts the message, encapsulates the message within an AONP message, and sends the AONP message to AEP CP 1206, which decapsulates the message from the AONP message and sends the message to sending application 1202. According to a third route, receiving application 1204 sends the message toward sending application 1202, but AEP SP 1208 intercepts the message and sends the message to sending application 1202.

Figure 13:
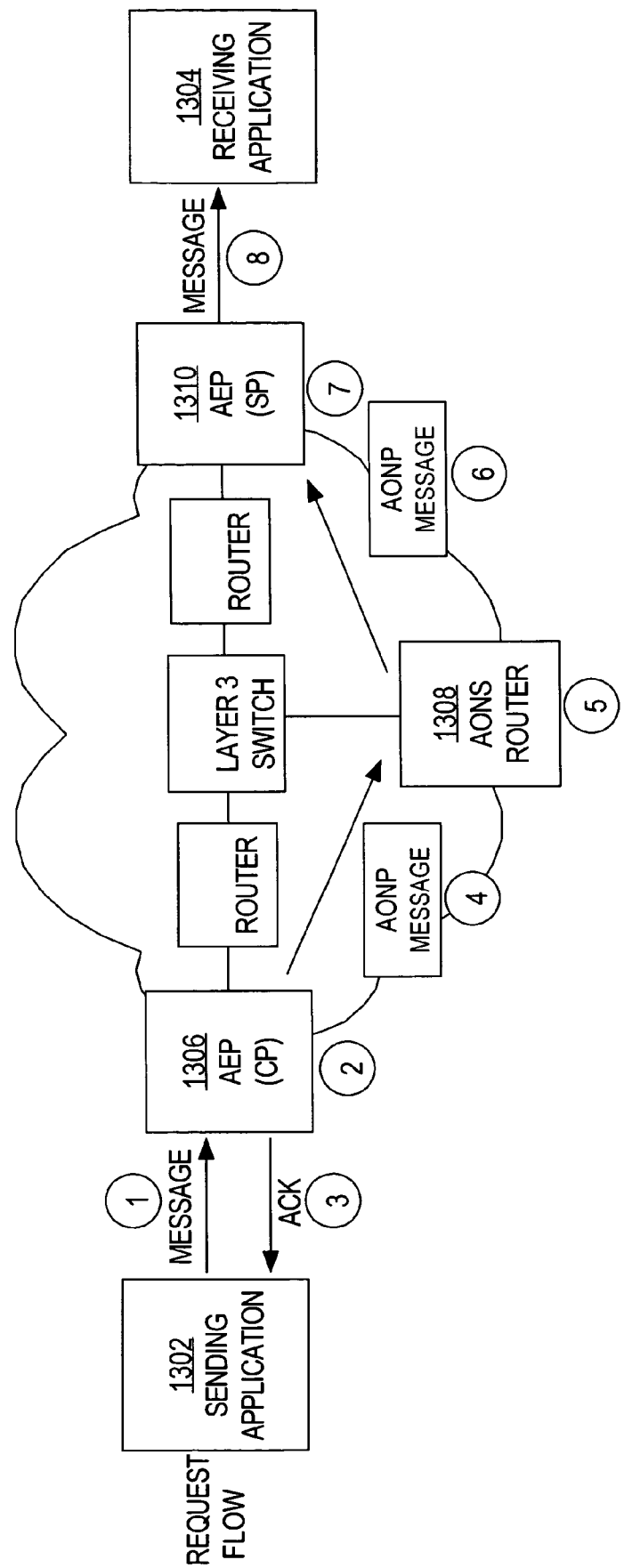
FIG. 13 is a diagram that illustrates a one-way message flow.

FIG. 13 is a diagram that illustrates a one-way message flow. At circumscribed numeral 1, a sending application 1302 sends a message towards a receiving application 1304. At circumscribed numeral 2, an AEP CP 1306 intercepts the message and adds an AONP header to the message, forming an AONP message. At circumscribed numeral 3, AEP CP 1306 sends an ACK (acknowledgement) back to sending application 1302. At circumscribed numeral 4, AEP CP 1306 sends the AONP message to an AONS router 1308. At circumscribed numeral 5, AONS router 1308 receives the AONP message. At circumscribed numeral 6, AONS router 1308 sends the AONP message to an AEP SP 1310. At circumscribed numeral 7, AEP SP 1310 receives the AONP message and removes the AONP header from the message, thus decapsulating the message. At circumscribed numeral 8, AEP SP 1310 sends the message to receiving application 1304.

Figure 14:
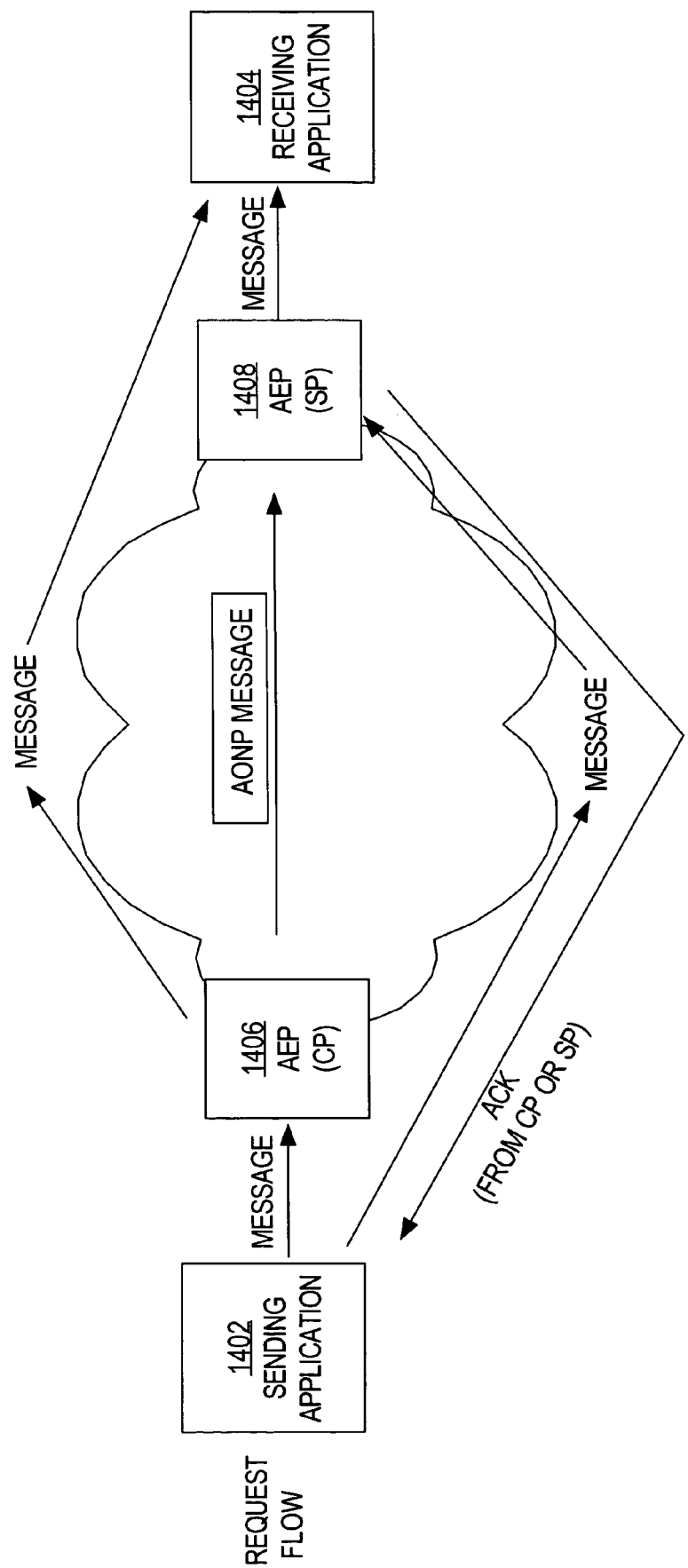
FIG. 14 is a diagram that illustrates alternative one-way message flows.

FIG. 14 is a diagram that illustrates alternative one-way message flows. FIG. 14 shows three possible routes that a message might take from a sending application 1402 to a receiving application 1404. According to a first route, sending application 1402 sends the message toward receiving application 1404, but an AEP CP 1406 intercepts the message and sends the message to receiving application 1404. AEP CP 1406 sends an ACK (acknowledgement) to sending application 1402. According to a second route, sending application 1402 sends the message toward receiving application 1404, but AEP CP 1406 intercepts the message, encapsulates the message within an AONP message, and sends the AONP message to an AEP SP 1408, which decapsulates the message from the AONP message and sends the message to receiving application 1404. Again, AEP CP 1406 sends an ACK to sending application 1402. According to a third route, sending application 1402 sends the message toward receiving application 1404, but AEP SP 1408 intercepts the message and sends the message to receiving application 1404. In this case, AEP SP 1408 sends an ACK to sending application 1402. Thus, when an AEP intercepts a message, the intercepting AEP sends an ACK to the sending application.

According to one embodiment, AONP is used in node-to-node communication with the next hop. In one embodiment, AONP uses HTTP. AONP headers may include HTTP or TCP headers. AONP may indicate RM ACK, QoS level, message priority, and message context (connection, message sequence numbers, message context identifier, entry node information, etc.). The actual message payload is in the message body. Asynchronous messaging may be used between AONS nodes. AONS may conduct route and node discovery via static configuration (next hop) and/or via dynamic discovery and route advertising ("lazy" discovery).

Figure 15A:
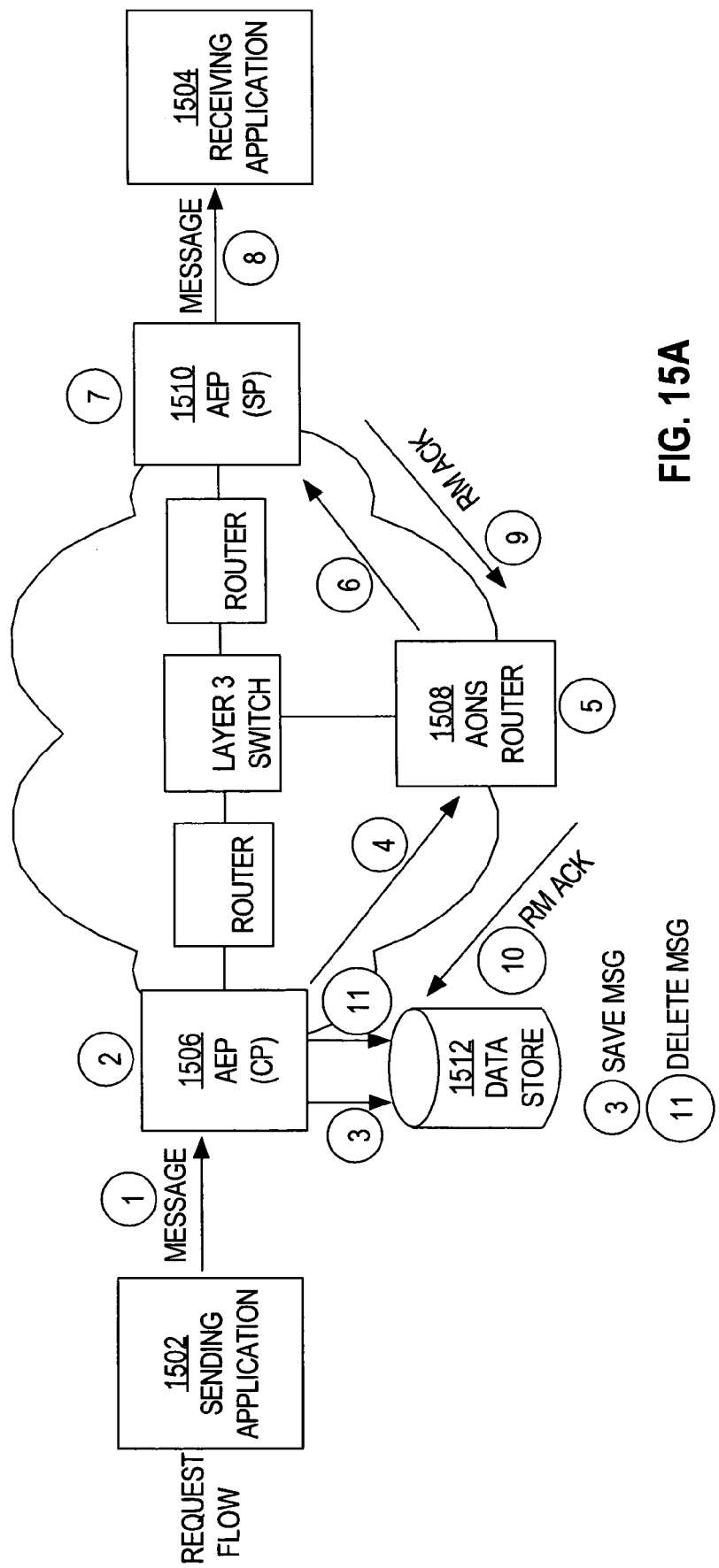
FIG. 15A and FIG. 15B are diagrams that illustrate a request/response message flow with reliable message delivery.
Figure 15B:
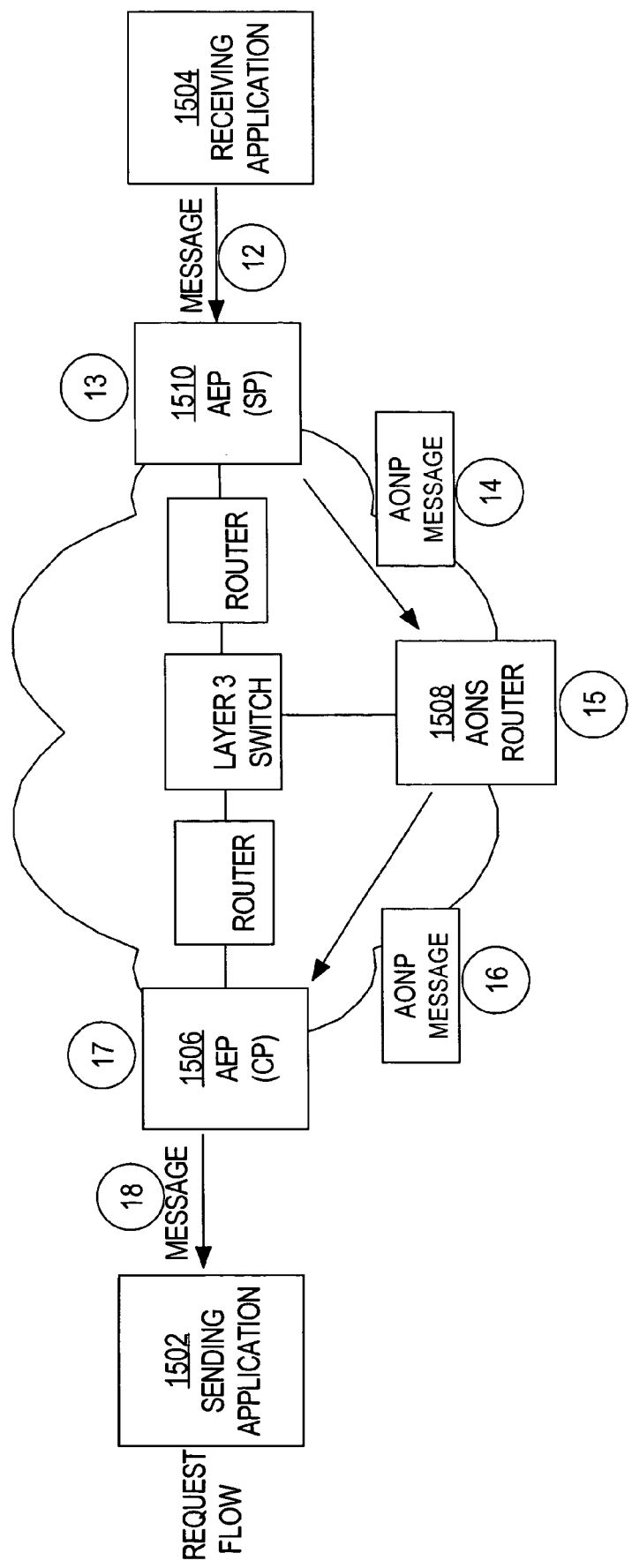

FIG. 15A and FIG. 15B are diagrams that illustrate a request/response message flow with reliable message delivery. Referring to FIG. 15A, at circumscribed numeral 1, a sending application 1502 sends a message towards a receiving application 1504. At circumscribed numeral 2, an AEP CP 1506 intercepts the message and adds an AONP header to the message, forming an AONP message. At circumscribed numeral 3, AEP CP 1506 saves the message to a data store 1512. Thus, if there are any problems with sending the message, AEP CP 1506 can resend the copy of the message that is stored in data store 1512.

At circumscribed numeral 4, AEP CP 1506 sends the AONP message to an AONS router 1508. At circumscribed numeral 5, AONS router 1508 receives the AONP message. At circumscribed numeral 6, AONS router 1508 sends the AONP message to an AEP SP 1510. At circumscribed numeral 7, AEP SP 1510 receives the AONP message and removes the AONP header from the message, thus decapsulating the message. At circumscribed numeral 8, AEP SP 15 10 sends the message to receiving application 1504.

At circumscribed numeral 9, AEP SP 1510 sends a reliable messaging (RM) acknowledgement (ACK) to AONS router 1508. At circumscribed numeral 10, AONS router 1508 receives the RM ACK and sends the RM ACK to AEP CP 1506. At circumscribed numeral 11, AEP CP 1506 receives the RM ACK and, in response, deletes the copy of the message that is stored in data store 1512. Because the delivery of the message has been acknowledged, there is no further need to store a copy of the message in data store 1512. Alternatively, if AEP CP 1506 does not receive the RM ACK within a specified period of time, then AEP CP 1506 resends the message.

Referring to FIG. 15B, at circumscribed numeral 12, receiving application 1504 sends a response message toward sending application 1502. At circumscribed numeral 13, AEP SP 1510 intercepts the message and adds an AONP header to the message, forming an AONP message. At circumscribed numeral 14, AEP SP 1510 sends the AONP message to AONS router 1508. At circumscribed numeral 15, AONS router 1508 receives the AONP message. At circumscribed numeral 16, AONS router 1508 sends the AONP message to AEP CP 1506. At circumscribed numeral 17, AEP CP 1506 receives the AONP message and removes the AONP header from the message, thus decapsulating the message. At circumscribed numeral 18, AEP CP 1506 sends the message to sending application 1502.

FIG. 16 is a diagram that illustrates a one-way message flow with reliable message delivery. At circumscribed numeral 1, a sending application 1602 sends a message towards a receiving application 1604. At circumscribed numeral 2, an AEP CP 1606 intercepts the message and adds an AONP header to the message, forming an AONP message. At circumscribed numeral 3, AEP CP 1606 saves the message to a data store 1612. Thus, if there are any problems with sending the message, AEP CP 1606 can resend the copy of the message that is stored in data store 1612. At circumscribed numeral 4, AEP CP 1606 sends an ACK (acknowledgement) back to sending application 1602. At circumscribed numeral 5, AEP CP 1606 sends the AONP message to an AONS router 1608. At circumscribed numeral 6, AONS router 1608 receives the AONP message. At circumscribed numeral 7, AONS router 1608 sends the AONP message to an AEP SP 1610. At circumscribed numeral 8, AEP SP 1610 receives the AONP message and removes the AONP header from the message, thus decapsulating the message. At circumscribed numeral 9, AEP SP 1610 sends the message to receiving application 1604.

At circumscribed numeral 10, AEP SP 1610 sends a reliable messaging (RM) acknowledgement (ACK) to AONS router 1608. At circumscribed numeral 11, AONS router 1608 receives the RM ACK and sends the RM ACK to AEP CP 1606. At circumscribed numeral 12, AEP CP 1606 receives the RM ACK and, in response, deletes the copy of the message that is stored in data store 1612. Because the delivery of the message has been acknowledged, there is no further need to store a copy of the message in data store 1612. Alternatively, if AEP CP 1606 does not receive the RM ACK within a specified period of time, then AEP CP 1606 resends the message.

Figure 17:
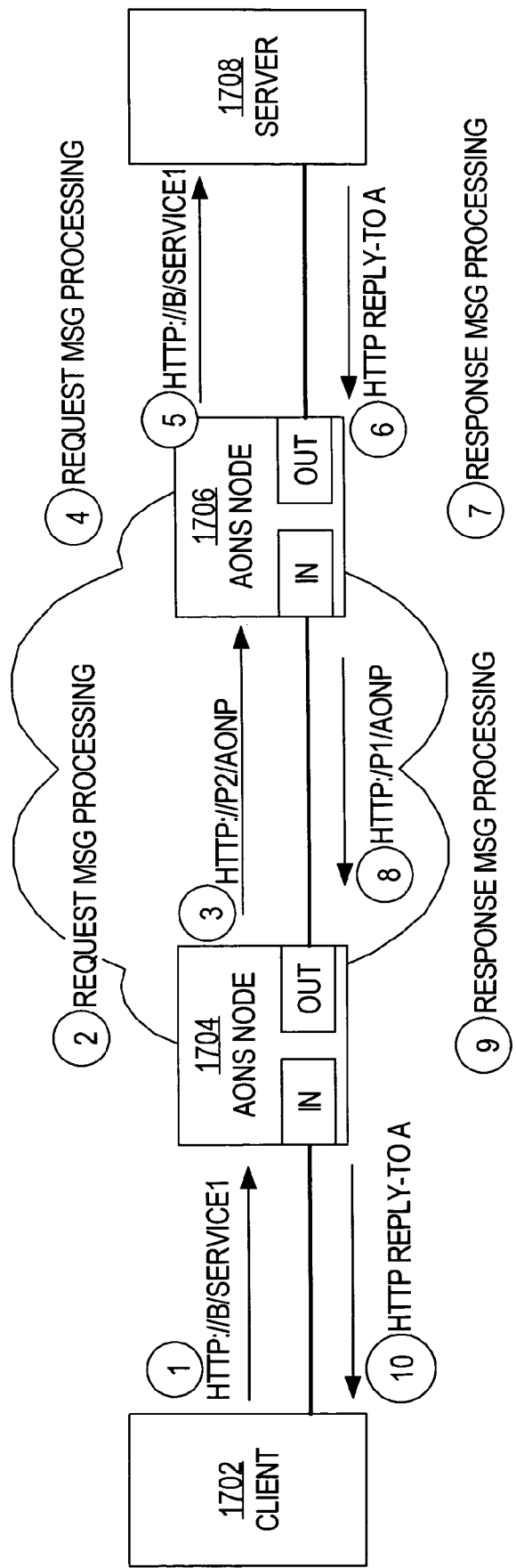
FIG. 17 is a diagram that illustrates synchronous request and response messages.

FIG. 17 is a diagram that illustrates synchronous request and response messages. At circumscribed numeral 1, an AONS node 1704 receives, from a client 1702, a request message, in either implicit or explicit mode. At circumscribed numeral 2, AONS node 1704 reads the message, selects and executes a flow, and adds an AONP header to the message. At circumscribed numeral 3, AONS node 1704 sends the message to a next hop node, AONS node 1706. At circumscribed numeral 4, AONS node 1706 reads the message, selects and executes a flow, and removes the AONP header from the message, formatting the message according to the message format expected by a server 1708. At circumscribed numeral 5, AONS node 1706 sends the message to the message's destination, server 1708.

At circumscribed numeral 6, AONS node 1706 receives a response message from server 1708 on the same connection on which AONS node 1706 sent the request message. At circumscribed numeral 7, AONS node 1706 reads the message, correlates the message with the request message, executes a flow, and adds an AONP header to the message. At circumscribed numeral 8, AONS node 1706 sends the message to AONS node 1704. At circumscribed numeral 9, AONS node 1704 reads the message, correlates the message with the request message, executes a flow, and removes the AONP header from the message, formatting the message according to the message format expected by client 1702. At circumscribed numeral 10, AONS node 1704 sends the message to client 1702 on the same connection on which client 1702 sent the request message to AONS node 1704.

Figure 18:
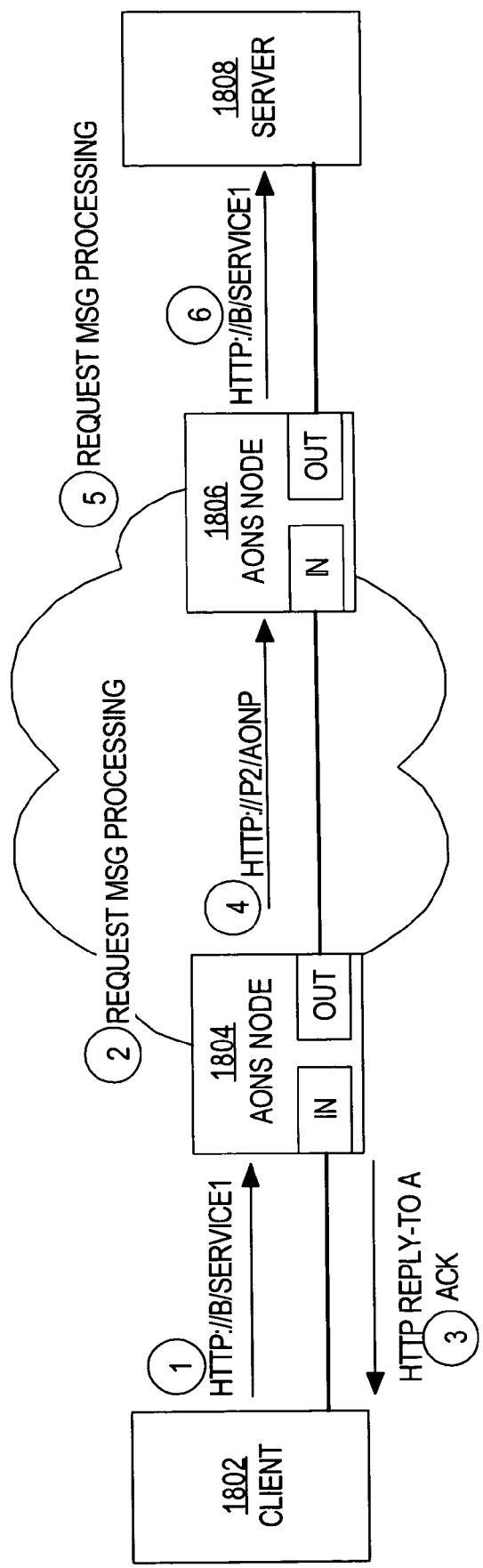
FIG. 18 is a diagram that illustrates a sample one-way end-to-end message flow.

FIG. 18 is a diagram that illustrates a sample one-way end-to-end message flow. At circumscribed numeral 1, an AONS node 1804 receives, from a client 1802, a request message, in either implicit or explicit mode. At circumscribed numeral 2, AONS node 1804 reads the message, selects and executes a flow, and adds an AONP header to the message. At circumscribed numeral 3, AONS node 1804 sends an acknowledgement to client 1802. At circumscribed numeral 4, AONS node 1804 sends the message to a next hop node, AONS node 1806. At circumscribed numeral 5, AONS node 1806 reads the message, selects and executes a flow, and removes the AONP header from the message, formatting the message according to the message format expected by a server 1808. At circumscribed numeral 6, AONS node 1806 sends the message to the message's destination, server 1808.

According to the node view, the message lifecycle within an AONS node, involves ingress/egress processing, message processing, message execution control, and flow execution.

Figure 19:
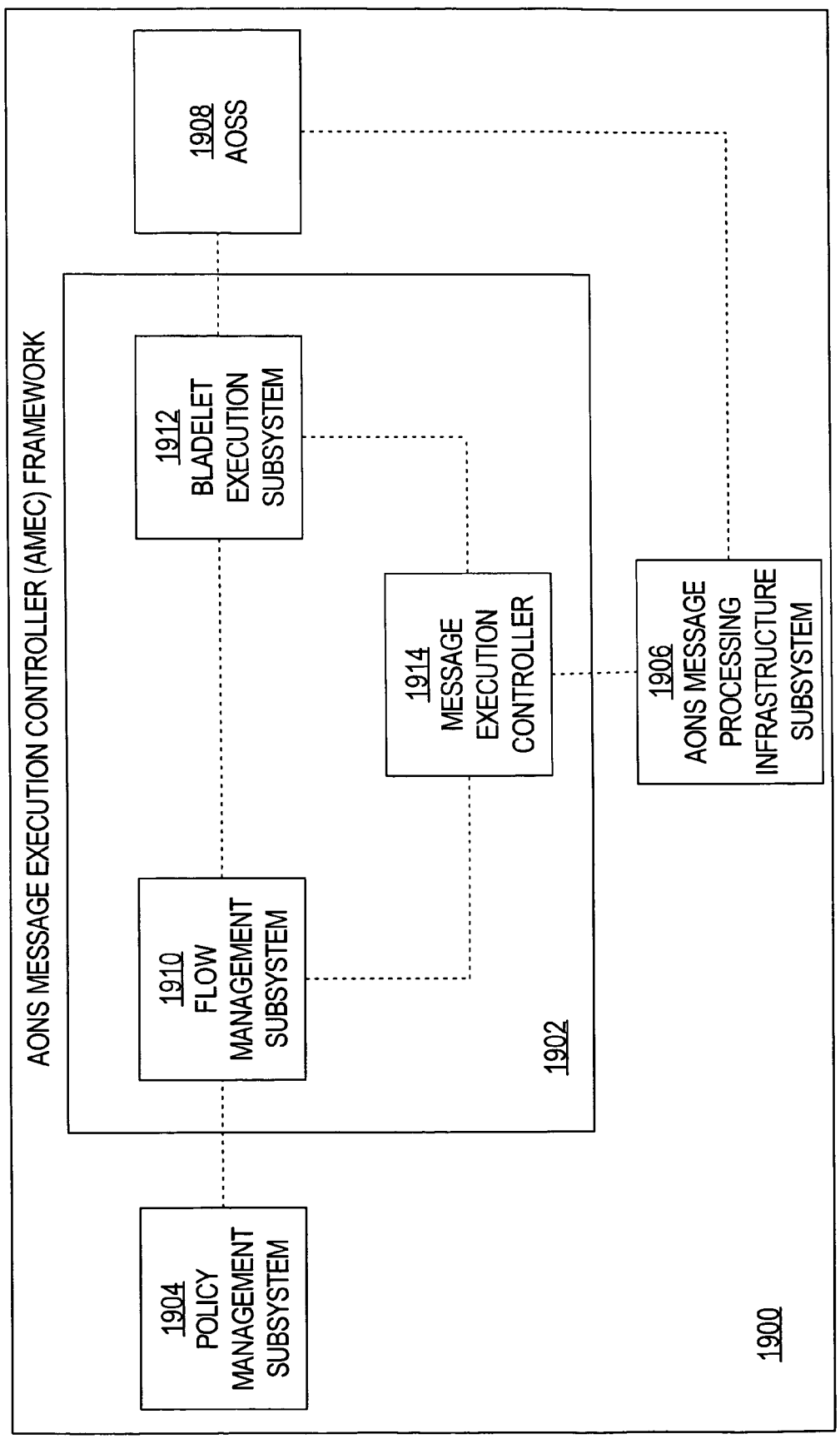
FIG. 19 is a diagram that illustrates message-processing modules within an AONS node.

FIG. 19 is a diagram that illustrates message-processing modules within an AONS node 1900. AONS node 1900 comprises an AONS message execution controller (AMEC) framework 1902, a policy management subsystem 1904, an AONS message processing infrastructure subsystem 1906, and an AOSS 1908. AMEC framework 1902 comprises a flow management subsystem 1910, a bladelet™ execution subsystem 1912, and a message execution controller 1914. Policy management subsystem 1904 communicates with flow management subsystem 1910. AOSS 1908 communicates with bladelet™ execution subsystem 1912 and AONS message processing infrastructure subsystem 1906. AONS message processing infrastructure subsystem 1906 communicates with message execution controller 1914. Flow management subsystem 1910, bladelet™ execution subsystem, and message execution controller 1914 all communicate with each other.

Figure 20:
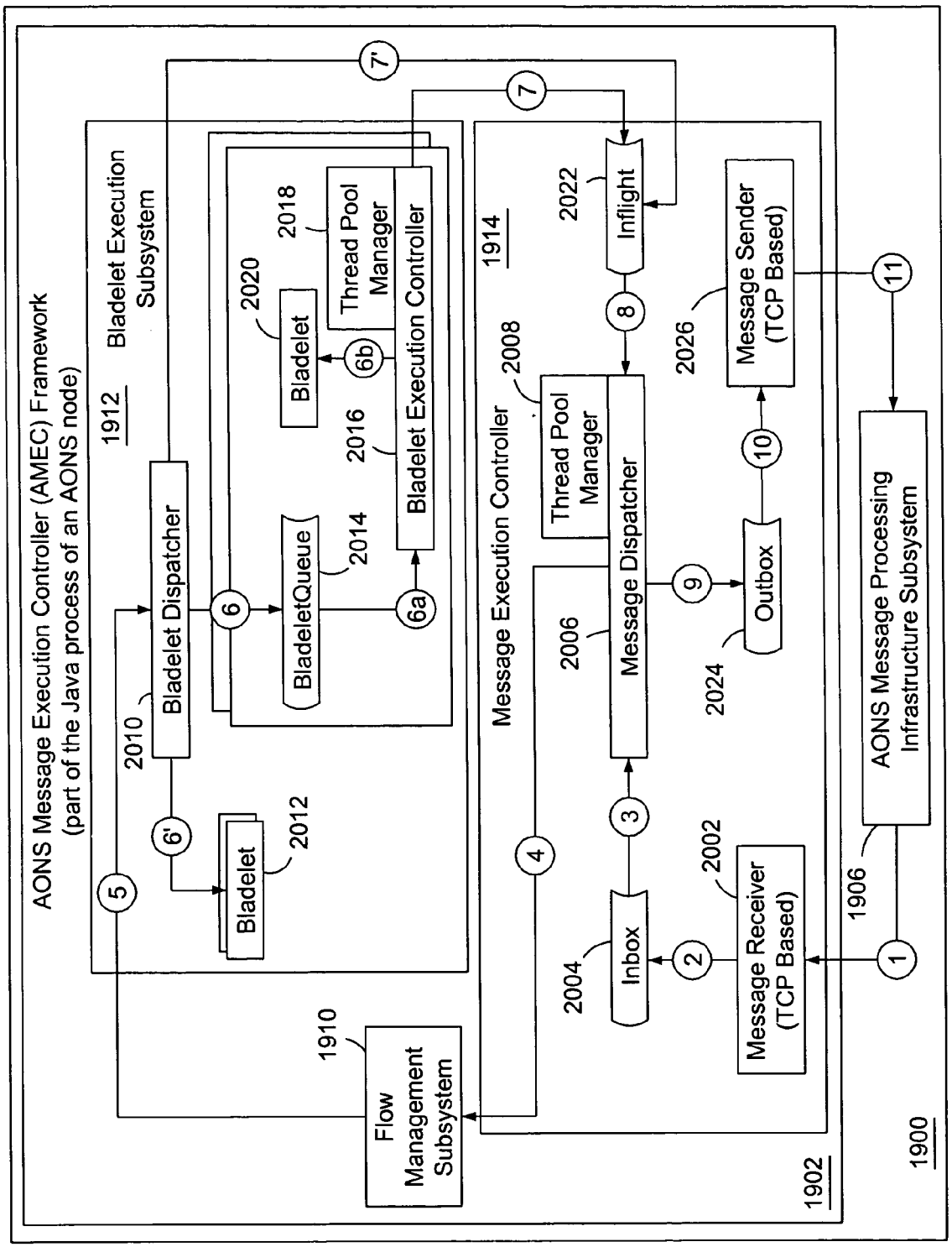
FIG. 20 is a diagram that illustrates message processing within AONS node.

FIG. 20 is a diagram that illustrates message processing within AONS node 1900. AMEC framework 1902 is an event-based multi-threaded mechanism to maximize throughput while minimizing latency for messages in the AONS node. According to one embodiment, received packets are re-directed, TCP termination is performed, SSL termination is performed if needed, Layer 5 protocol adapter and access method processing is performed (using access methods such as HTTP, SMTP, FTP, JMS/MQ, JMS/RV, JDBC, etc.), AONS messages (normalized message format for internal AONS processing) are formed, messages are queued, messages are dequeued based on processing thread availability, a flow (or rule) is selected, the selected flow is executed, the message is forwarded to the message's destination, and for request/response-based semantics, responses are handled via connection/session state maintained within AMEC framework 1902.

In one embodiment, executing the flow comprises executing each step (i.e., bladelet™/action) of the flow. If a bladelet™ is to be run within a separate context, then AMEC framework 1902 may enqueue into bladelet™-specific queues, and, based on thread availability, dequeue appropriate bladelet™ states from each bladelet™ queue.

3.4.10 Flows, Bladelets™, and Scriptlets™

According to one embodiment, flows string together bladelets™ (i.e., actions) to customize message processing logic. Scriptlets™ provide a mechanism for customers and partners to customize or extend native AONS functionality. Some bladelets™ and services may be provided with an AONS node.

3.4.11 Aons Services

As mentioned in the previous section, a set of core services may be provided by AONS to form the underlying foundation of value-added functionality that can be delivered via an AONS node. In one embodiment, these include: Security Services, Standard Compression Services, Delta Compression Services, Caching Service, Message Logging Service, Policy Management Service (Policy Manager), Reliable Messaging Service, Publish/Subscribe Service, Activity Monitoring Service, Message Distribution Service, XML Parsing Service, XSLT Transformation Service, and QoS Management Service. In one embodiment, each AONS core service is implemented within the context of a service framework.

3.4.12 Aons Configuration and Management

In one embodiment, an AONS node is provisioned and configured for a class of application messages, where it enforces the policies that are declaratively defined on behalf-of the application end-points, business-domains, security-domains, administrative domains, and network-domains. Furthermore, the AONS node promotes flexible composition and customization of different product functional features by means of configurability and extensibility of different software and hardware sub-systems for a given deployment scenario. Due to the application and network embodiments of the AONS functionality, the AONS architecture framework should effectively and uniformly address different aspects of configurability, manageability, and monitorability of the various system components and their environments.

The AONS Configuration and Management framework is based upon five functional areas ("FCAPS") for network management as recommended by the ISO network management forum. The functional areas include fault management, configuration management, accounting management, performance management, and security management. Fault management is the process of discovering, isolating, and fixing the problems or faults in the AONS nodes. Configuration management is the process of finding and setting up the AONS nodes. Accounting management involves tracking usage and utilization of AONS resources to facilitate their proper usage. Performance management is the process of measuring the performance of the AONS system components and the overall system. Security management controls access to information on the AONS system. Much of the above functionality is handled via proper instrumentation, programming interfaces, and tools as part of the overall AONS solution.

Figure 21:
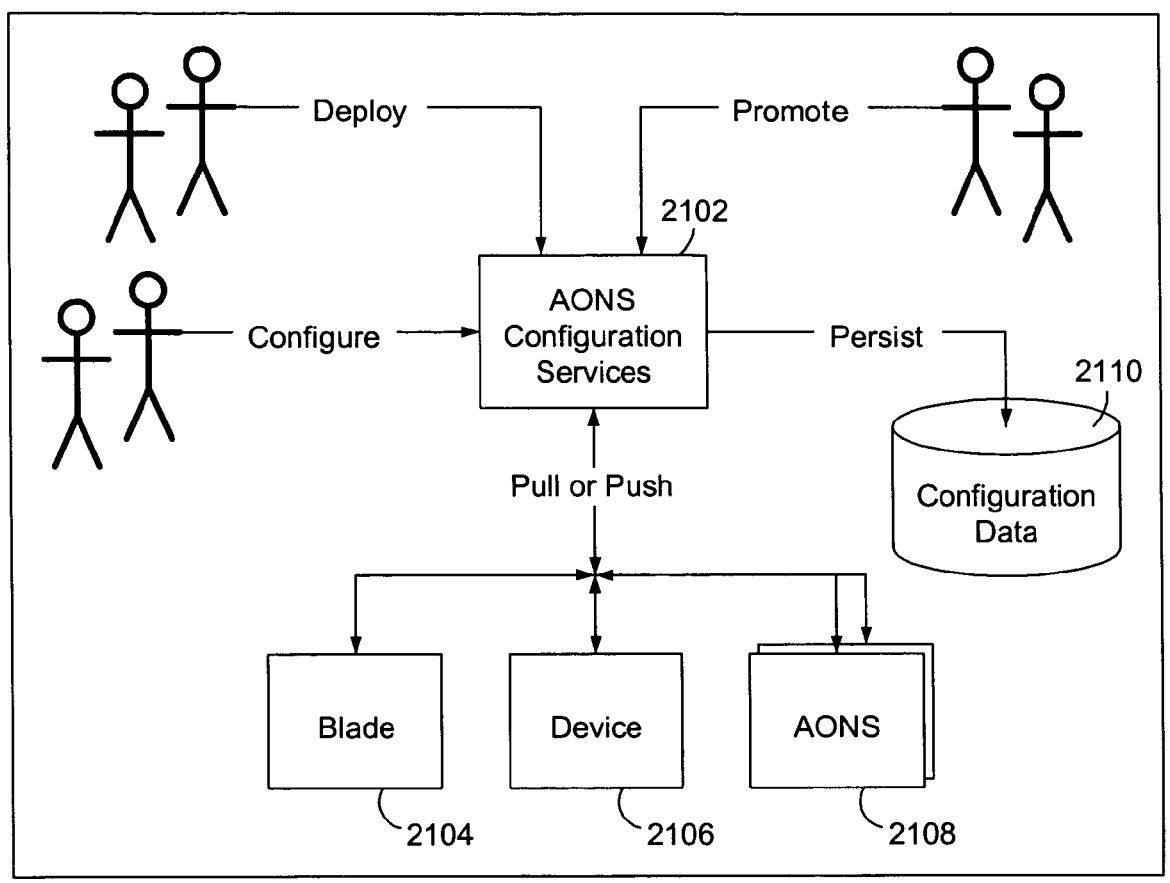
FIG. 21, FIG. 22, and FIG. 23 are diagrams that illustrate entities within an AONS configuration and management framework.
Figure 22:
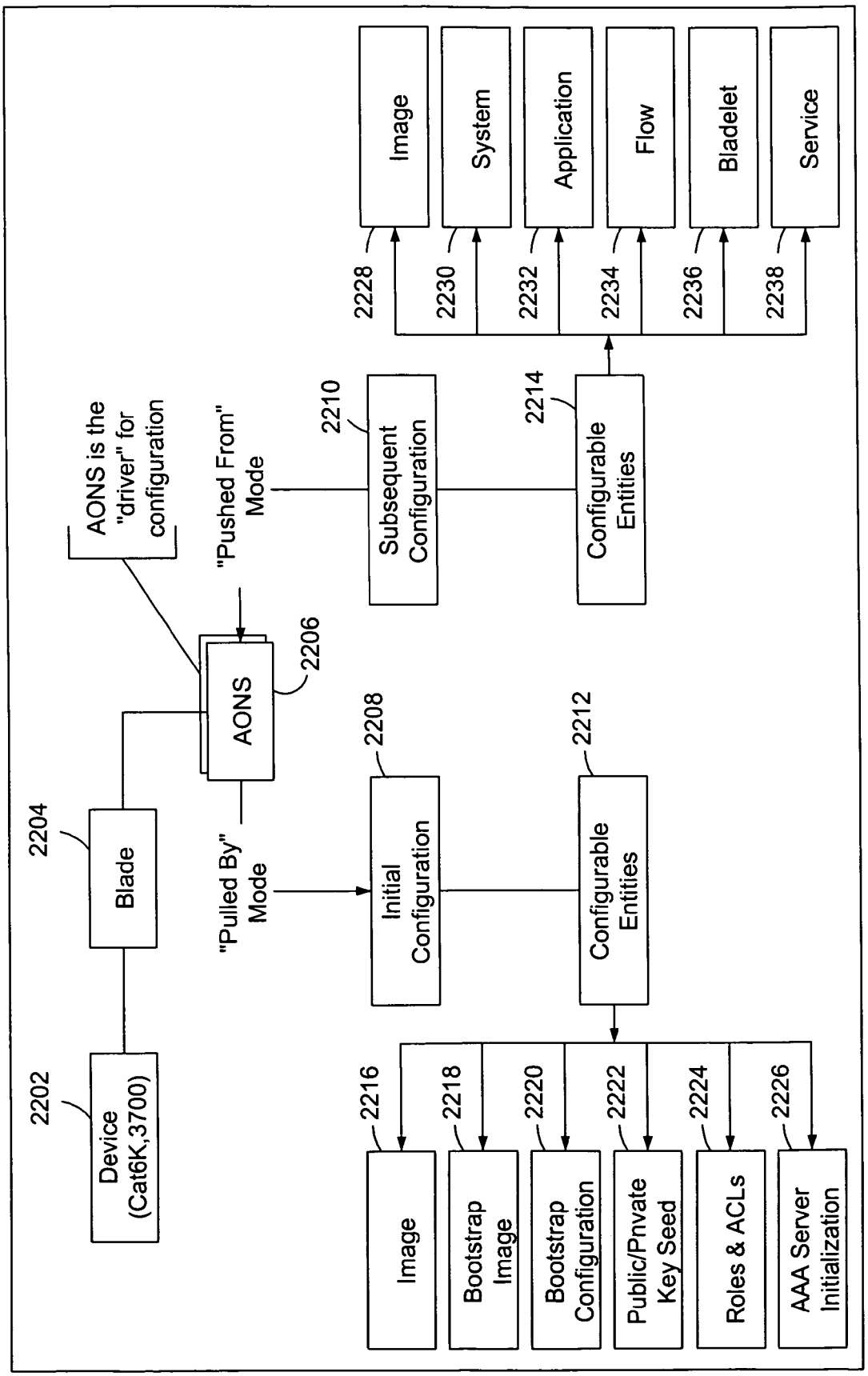
Figure 23:
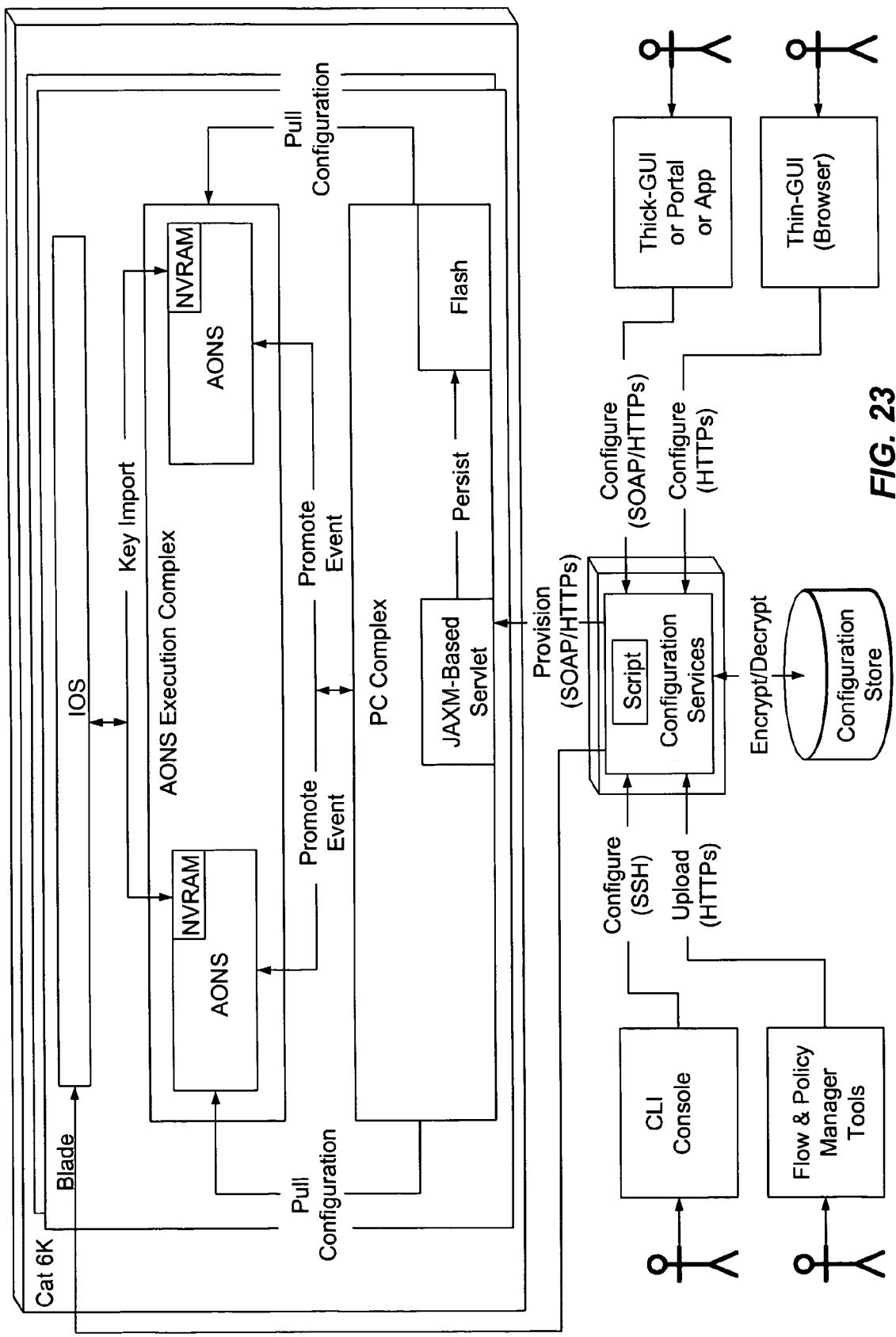

FIG. 21, FIG. 22, and FIG. 23 are diagrams that illustrate entities within an AONS configuration and management framework. A configuring and provisioning server (CPS) is the centralized hub for configuration and management of AONS policies, flows, scriptlets™ and other manageable entities. Configurable data is pushed to the CPS from an AONS design studio (flow tool) and the AONS admin may then provision this data to the production deployment. A promotion process is also provided to test and validate changes via a development to staging/certification to production rollout process. A configuration and provisioning agent (CPA) resides on individual AONS blades and provides the local control and dispatch capabilities for AONS. The CPA interacts with the CPS to get updates. The CPA takes appropriate actions to implement changes. The CPA is also used for collecting monitoring data to report to third party consoles.

3.4.13 Aons Monitoring

Figure 24:
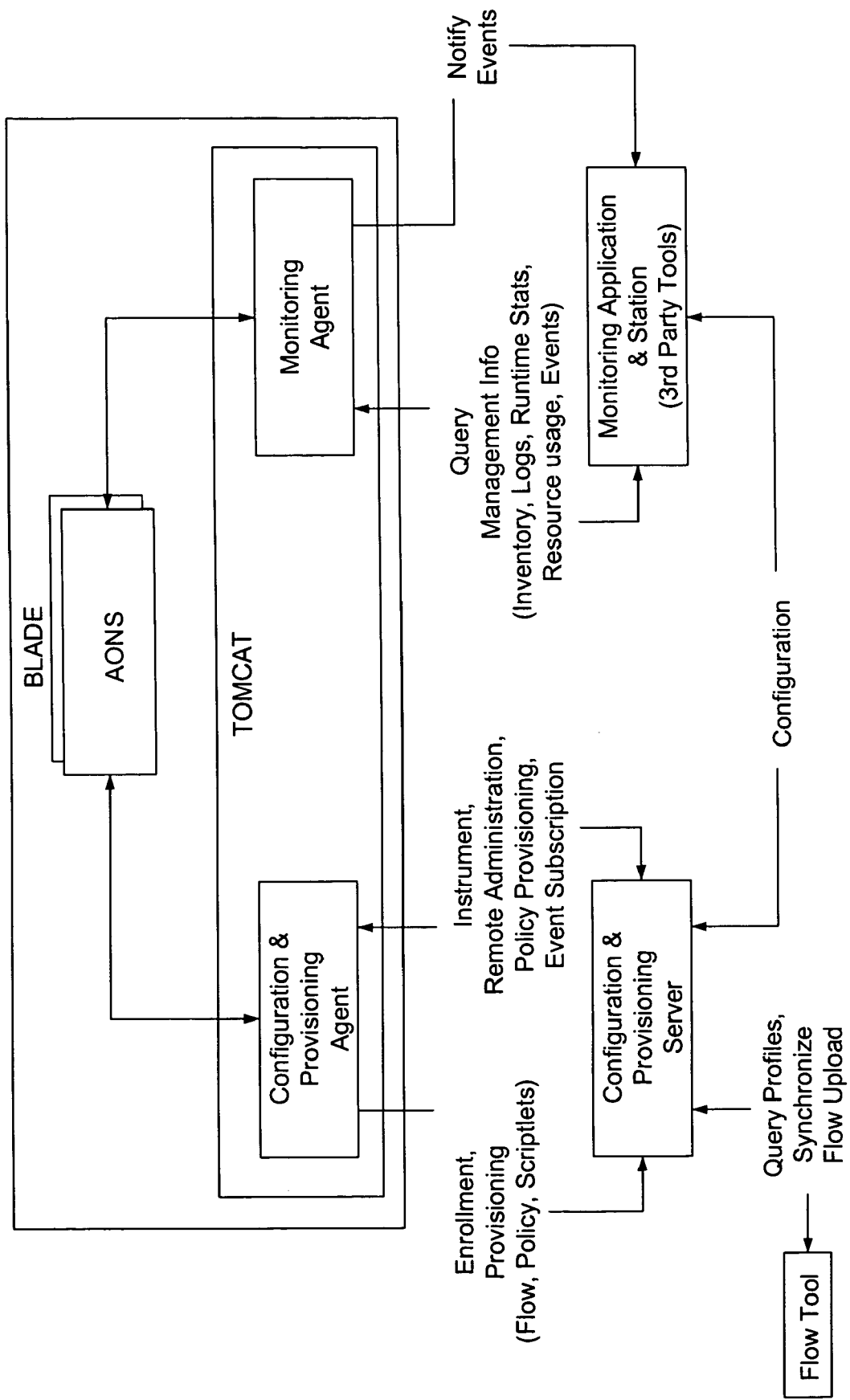
FIG. 24 is a diagram that illustrates an AONS monitoring architecture.

In one embodiment, AONS is instrumented to support well-defined events for appropriate monitoring and visibility into internal processing activities. The monitoring of AONS nodes may be accomplished via a pre-defined JMX MBean agent that is running on each AONS node. This agent communicates with a remote JMx MBean server on the PC complex. An AONS MIB is leveraged for SNMP integration to third party consoles. FIG. 24 is a diagram that illustrates an AONS monitoring architecture.

3.4.14 Aons Tools

In one embodiment, the following tool sets are provided for various functional needs of AONS: a design studio, an admin studio, and a message log viewer. The design studio is a visual tool for designing flows and applying message classification and mapping policies. The admin studio is a web-based interface to perform all administration and configuration functions. The message log viewer is a visual interface to analyze message traffic, patterns, and trace information.

4.0 Implementation Mechanisms—Hardward Overview

Figure 5:
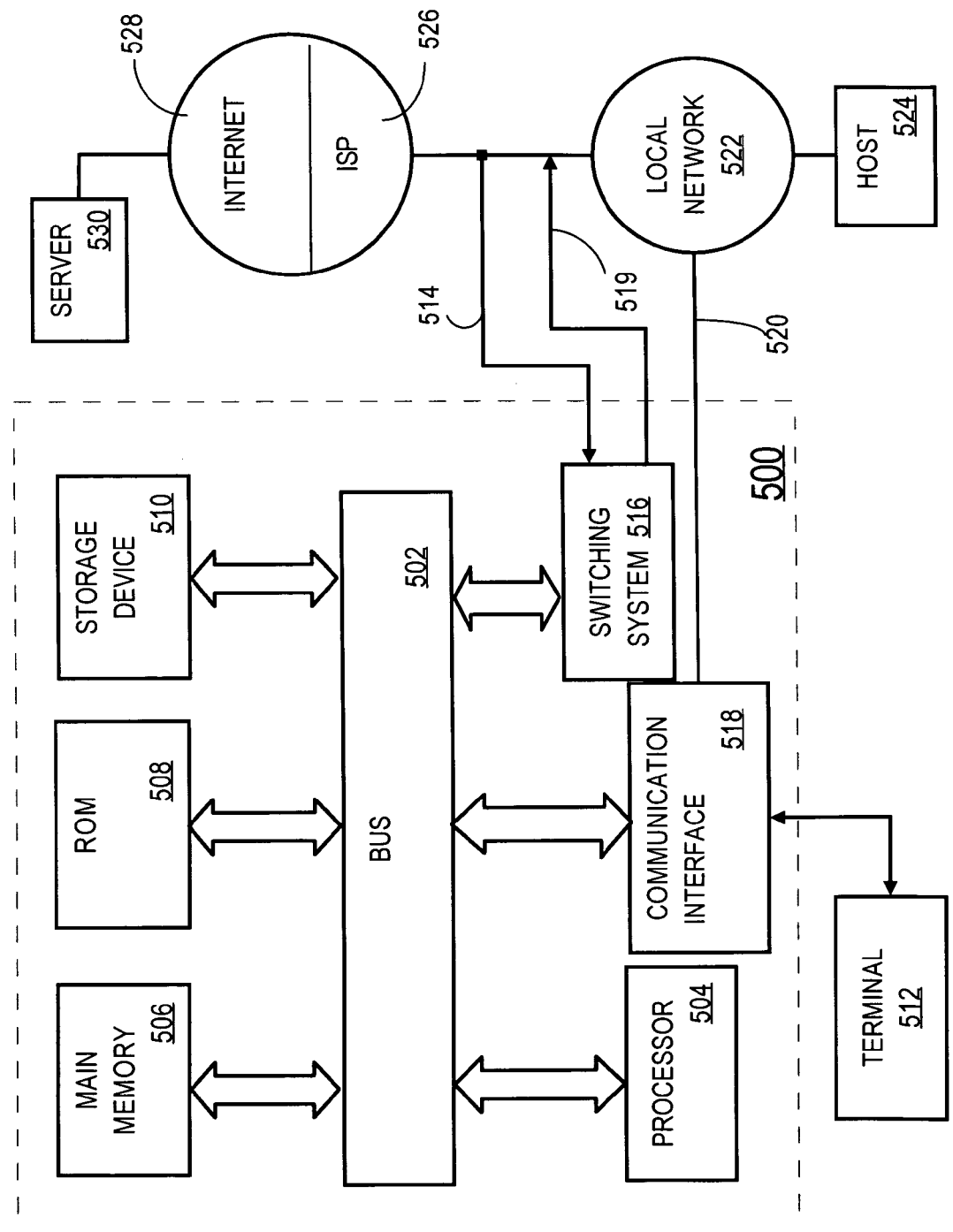
FIG. 5 is a block diagram that illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a proxy device. Thus, in this embodiment, the computer system 500 is a proxy device such as a load balancer.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for avoiding the storage of client state on computer system 500. According to one embodiment of the invention, computer system 500 provides for such updating in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for avoiding the storage of client state on a server as described herein.

Processor 504 may execute the received code as it is received and/or stored in storage device 510 or other non-volatile storage for later execution. In this manner, computer system 500 may obtain application code in the form of a carrier wave.

5.0 Extension and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of interpreting an application layer message at a network element, the method comprising the computer-implemented steps of:
   switching a state of the network element between a sampling state and a processing state;
   while the state of the network element is the sampling state, performing:
      receiving a group of data packets at the network element, wherein each data packet in the group of data packets comprises a separate packet header group and a separate payload portion;
      inspecting payload portions of data packets in the data packet group to determine application layer messages that are collectively contained in one or more of the payload portions;
      for each particular message classification in a set of message classifications, determining a separate message subset of the application layer messages that satisfy all criteria associated with the particular message classification, thereby producing one or more message subsets; and
      for each particular message subset in the message subsets, determining a separate set of characteristics that are possessed by every packet header group that was contained in a data packet that also contained at least a portion of an application layer message that is in the particular message subset, thereby producing one or more characteristic sets; and
   while the state of the network element is the processing state, performing:
      receiving, at the network element, a first data packet that comprises a first packet header group and a first payload portion;
      determining whether the first packet header group possesses all of the characteristics contained in any of the characteristic sets;
      if the first packet header group possesses all of the characteristics contained in any characteristic set in the characteristic sets, then inspecting the first payload portion to determine at least a portion of a first application layer message that is contained therein; and
      if the first packet header group does not possess all of the characteristics contained in at least one of the characteristic sets, then sending the first data packet toward a destination without inspecting the first payload portion.

2. A method as recited in claim 1, further comprising:
   if the first packet header group possesses all of the characteristics contained in any characteristic set in the characteristic sets, then performing steps comprising:
      determining whether at least a portion of the first application layer message satisfies all criteria associated with a first message classification in the set of message classifications; and
      if at least a portion of the first application layer message satisfies all criteria associated with the first message classification, then performing, at the network element, one or more actions that are associated with the first message classification.

3. A method as recited in claim 1, wherein the network element is a network router.

4. A method as recited in claim 1, wherein determining a separate message subset comprises determining a message subset of the application layer messages that are Extensible Markup Language (XML) documents that contain a specified path within a hierarchical structure.

5. A method as recited in claim 1, wherein determining a separate set of characteristics comprises determining whether source addresses that are specified in Internet Protocol (IP) headers of data packets are the same.

6. A method as recited in claim 1, wherein determining a separate set of characteristics comprises determining whether destination addresses that are specified in Internet Protocol (IP) headers of data packets are the same.

7. A method as recited in claim 1, wherein determining a separate set of characteristics comprises determining whether ports that are specified in Transport Control Protocol (TCP) headers of data packets are the same.

8. A volatile or non-volatile computer-readable medium carrying one or more sequences of instructions for interpreting an application layer message at a network element, which instructions, when executed by one or more processors, cause the one or more processors to carry out the steps of:
   switching a state of the network element between a sampling state and a processing state;
   while the state of the network element is the sampling state, performing:
      receiving a group of data packets at the network element, wherein each data packet in the group of data packets comprises a separate packet header group and a separate payload portion;
      inspecting payload portions of data packets in the data packet group to determine application layer messages that are collectively contained in one or more of the payload portions;
      for each particular message classification in a set of message classifications, determining a separate message subset of the application layer messages that satisfy all criteria associated with the particular message classification, thereby producing one ore more message subsets; and
      for each particular message subset in the message subsets, determining a separate set of characteristics that are possessed by every packet header group that was contained in a data packet that also contained at least a portion of an application layer message that is in the particular message subset, thereby producing characteristic sets; and
   while the state of the network element is the processing state, performing:
      receiving, at the network element, a first data packet that comprises a first packet header group and a first payload portion;

determining whether the first packet header group possesses all of the characteristics contained in any of the characteristic sets;

if the first packet header group possesses all of the characteristics contained in any characteristic set in the characteristic sets, then inspecting the first payload portion to determine at least a portion of a first application layer message that is contained therein; and if the first packet header group does not possess all of the characteristics contained in at least one of the characteristic sets, then sending the first data packet toward a destination without inspecting the first payload portion.

9. A volatile or non-volatile computer-readable medium as recited in claim 8, wherein the steps further comprise:

if the first packet header group possesses all of the characteristics contained in any of the characteristic sets, then performing steps comprising:

determining whether at least a portion of the first application layer message satisfies all criteria associated with a first message classification in the set of message classifications; and if at least a portion of the first application layer message satisfies all criteria associated with the first message classification, then performing, at the network element, one or more actions that are associated with the first message classification.

10. A volatile or non-volatile computer-readable medium as recited in claim 8, wherein the network element is a network router.

11. A volatile or non-volatile computer-readable medium as recited in claim 8, wherein determining a separate message subset comprises determining a message subset that comprises those of the application layer messages that are Extensible Markup Language (XML) documents that contain a specified path within a hierarchical structure.

12. A volatile or non-volatile computer-readable medium as recited in claim 8, wherein determining a separate set of characteristics comprises determining whether source addresses that are specified in Internet Protocol (IP) headers of data packets are the same.

13. A volatile or non-volatile computer-readable medium as recited in claim 8, wherein determining a separate set of characteristics comprises determining whether destination addresses that are specified in Internet Protocol (IP) headers of data packets are the same.

14. A volatile or non-volatile computer-readable medium as recited in claim 8, wherein determining a separate set of characteristics comprises determining whether ports that are specified in Transport Control Protocol headers of data packets are the same.

15. An apparatus for interpreting an application layer message at a network element, the apparatus comprising:

means for switching a state of the network element between a sampling state and a processing state;

means for performing sampling while the state of the network element is the sampling state, wherein said means for performing first actions comprises:

means for receiving a group of data packets at the network element, wherein each data packet in the group of data packets comprises a separate packet header group and a separate payload portion;

means for inspecting payload portions of data packets in the data packet group to determine application layer messages that are collectively contained in one or more of the payload portions; and means for determining, for each particular message classification in a set of message classifications, a separate message subset of the application layer messages that satisfy all criteria associated with the particular message classification, thereby producing message subsets; and means for determining, for each particular message subset in the message subsets, a separate set of characteristics that are possessed by every packet header group that was contained in a data packet that also contained at least a portion of an application layer message that is in the particular message subset, thereby producing one or more characteristic sets;

means for performing processing while the state of the network element is the processing state, wherein said means for performing second actions comprises:

means for receiving, at the network element, a first data packet that comprises a first packet header group and a first payload portion;

means for determining whether the first packet header group possesses all of the characteristics contained in any of the characteristic sets;

means for inspecting the first payload portion to determine at least a portion of a first application layer message that is contained therein if the first packet header group possesses all of the characteristics contained in any of the characteristic sets; and means for sending the first data packet toward a destination without inspecting the first payload portion if the first packet header group does not possess all of the characteristics contained in at least one of the characteristic sets.

16. An apparatus for interpreting an application layer message at a network element, the apparatus comprising:

a network interface that is coupled to a data network for receiving one or more packet flows therefrom;

one or more processors;

a volatile or non-volatile computer-readable medium having one or more stored sequences of instructions which, when executed by the one or more processors, cause the one or more processors to carry out the steps of:

switching a state of the network element between a sampling state and a processing state;

while the state of the network element is the sampling state, performing:

receiving a group of data packets at the network element, wherein each data packet in the group of data packets comprises a separate packet header group and a separate payload portion;

inspecting payload portions of data packets in the group to determine application layer messages that are collectively contained in one or more of the payload portions;

for each particular message classification in a set of message classifications, determining a separate message subset that comprises those of the application layer messages that satisfy all criteria associated with the particular message classification, thereby producing message subsets; and for each particular message subset in the message subsets, determining a separate set of characteristics that are possessed by every packet header group that was contained in a data packet that also contained at least a portion of an application layer message that is in the particular message subset, thereby producing one or more characteristic sets; and while the state of the network element is the processing state, performing:
- receiving, at the network element, a first data packet that comprises a first packet header group and a first payload portion;
- determining whether the first packet header group possesses all of the characteristics contained in any of the characteristic sets;
- if the first packet header group possesses all of the characteristics contained in any of the characteristic sets, then inspecting the first payload portion to determine at least a portion of a first application layer message that is contained therein; and
- if the first packet header group does not possess all of the characteristics contained in at least one of the characteristic sets, then sending the first data packet toward a destination without inspecting the first payload portion.

17. An apparatus as recited in claim 16, wherein the one or more stored sequences of instructions comprise instructions which, when executed by the one or more processors, cause the one or more processors to carry out:
- if the first packet header group possesses all of the characteristics contained in any characteristic set in the characteristic sets, then performing steps comprising:
  - determining whether at least a portion of the first application layer message satisfies all criteria associated with a first message classification in the set of message classifications; and
  - if at least a portion of the first application layer message satisfies all criteria associated with the first message classification, then performing, at the network element, one or more actions that are associated with the first message classification.

18. An apparatus as recited in claim 16, wherein the network element is a network router.

19. An apparatus as recited in claim 16, wherein the instructions for determining a separate message subset comprise instructions for determining a message subset of the application layer messages that are Extensible Markup Language (XML) documents that contain a specified path within a hierarchical structure.

20. An apparatus as recited in claim 16, wherein the instructions for determining a separate set of characteristics comprise instructions for determining whether source addresses that are specified in Internet Protocol (IP) headers of data packets are the same.

21. An apparatus as recited in claim 16, wherein the instructions for determining a separate set of characteristics comprise instructions for determining whether destination addresses that are specified in Internet Protocol (IP) headers of data packets are the same.

22. An apparatus as recited in claim 16, wherein the instructions for determining a separate set of characteristics comprise instructions for determining whether ports that are specified in Transport Control Protocol (TCP) headers of data packets are the same.

* * * * *